United States Patent
Fowler et al.

(10) Patent No.: US 12,008,672 B2
(45) Date of Patent: Jun. 11, 2024

(54) SYSTEMS AND METHODS FOR DELIVERING AUGMENTED REALITY CONTENT

(71) Applicant: Digital Seat Media, Inc., Fort Worth, TX (US)

(72) Inventors: Cameron Fowler, Fort Worth, TX (US); Matthew Sullivan, Austin, TX (US)

(73) Assignee: Digital Seat Media, Inc., Fort Worth, TX (US)

( * ) Notice: Subject to any disclaimer, the term of this patent is extended or adjusted under 35 U.S.C. 154(b) by 0 days.

(21) Appl. No.: 17/660,665

(22) Filed: Apr. 26, 2022

(65) Prior Publication Data

US 2022/0345789 A1    Oct. 27, 2022

Related U.S. Application Data

(60) Provisional application No. 63/269,015, filed on Mar. 8, 2022, provisional application No. 63/201,376, filed
(Continued)

(51) Int. Cl.
*H04N 21/218*        (2011.01)
*G06Q 20/12*         (2012.01)
(Continued)

(52) U.S. Cl.
CPC ......... *G06Q 50/34* (2013.01); *G06Q 20/1235* (2013.01); *G06Q 20/4014* (2013.01);
(Continued)

(58) Field of Classification Search
CPC .......... H04N 21/816; H04N 21/21805; H04N 21/25866; H04N 21/41407; H04N 21/437;
(Continued)

(56) References Cited

U.S. PATENT DOCUMENTS 6,144,304 A    11/2000  Webb
6,658,348 B2  12/2003  Rudd et al.
(Continued)

FOREIGN PATENT DOCUMENTS

EP    2254083 A1    11/2010
EP    2988260 A1    2/2016
(Continued)

OTHER PUBLICATIONS

International Search Report issued in International Application No. PCT/US2021/071461 dated Feb. 10, 2022.
(Continued)

*Primary Examiner* — Mushfikh I Alam
(74) *Attorney, Agent, or Firm* — Vos-IP, LLC

(57) ABSTRACT

An augmented video system comprising: a server, a plurality of video cameras, a video storage device such as a database, and software capable of being operated on said server; wherein said plurality of video cameras capture a moment in time, each of said plurality of video cameras capturing a video file of said moment in time from a different perspective and storing each of said video files in a database; wherein said software combines each of said video files into a single combined video file; said combined video file being directed back to the server and said server generating a link to said combined video file; said combined video file being operably viewable as a video file on a computing device.

20 Claims, 15 Drawing Sheets

Related U.S. Application Data on Apr. 27, 2021, provisional application No. 63/201,373, filed on Apr. 27, 2021, provisional application No. 63/201,374, filed on Apr. 27, 2021.

(51) Int. Cl.
| | |
|---|---|
| *G06Q 20/40* | (2012.01) |
| *G06Q 50/34* | (2012.01) |
| *G07F 17/32* | (2006.01) |
| *H04N 21/258* | (2011.01) |
| *H04N 21/414* | (2011.01) |
| *H04N 21/437* | (2011.01) |
| *H04N 21/472* | (2011.01) |
| *H04N 21/482* | (2011.01) |
| *H04N 21/81* | (2011.01) |
| *H04N 21/8549* | (2011.01) |
| *H04N 21/858* | (2011.01) |

(52) U.S. Cl.
CPC ......... *G06Q 20/4015* (2020.05); *G07F 17/32* (2013.01); *H04N 21/21805* (2013.01); *H04N 21/25866* (2013.01); *H04N 21/41407* (2013.01); *H04N 21/437* (2013.01); *H04N 21/472* (2013.01); *H04N 21/482* (2013.01); *H04N 21/8133* (2013.01); *H04N 21/816* (2013.01); *H04N 21/8549* (2013.01); *H04N 21/8586* (2013.01)

(58) Field of Classification Search
CPC ............... H04N 21/472; H04N 21/482; H04N 21/8133; H04N 21/8549; H04N 21/8586
See application file for complete search history.

(56) References Cited

U.S. PATENT DOCUMENTS

| | | | |
|---|---|---|---|
| 7,379,886 B1 | 5/2008 | Zaring et al. | |
| 7,587,214 B2 | 9/2009 | Inselberg | |
| 7,817,990 B2 | 10/2010 | Pamminger et al. | |
| 8,056,802 B2 | 11/2011 | Gressel et al. | |
| 8,494,838 B2 | 7/2013 | Donabedian et al. | |
| 8,731,583 B2 | 5/2014 | Wengrovitz | |
| 8,971,861 B2 | 3/2015 | Gupta et al. | |
| 9,002,727 B2 | 4/2015 | Horowitz et al. | |
| 9,117,231 B2 | 8/2015 | Rodgers et al. | |
| 9,201,470 B2 * | 12/2015 | Kim ................ H04N 13/398 | |
| 9,223,750 B2 | 12/2015 | Liu et al. | |
| 9,223,885 B2 | 12/2015 | Marsico | |
| 9,324,079 B2 | 4/2016 | Moulin et al. | |
| 9,405,844 B2 | 8/2016 | Lim et al. | |
| 9,451,389 B2 | 9/2016 | Beg et al. | |
| 9,616,338 B1 * | 4/2017 | Hooper ................ G06F 3/016 | |
| 9,681,302 B2 | 6/2017 | Robinton et al. | |
| 9,767,645 B1 | 9/2017 | Cronin et al. | |
| 9,826,049 B2 * | 11/2017 | Lim ................ G06F 16/9558 | |
| 9,870,585 B2 | 1/2018 | Cronin et al. | |
| 9,883,344 B2 | 1/2018 | Bolton et al. | |
| 9,965,819 B2 | 5/2018 | Devries | |
| 9,977,865 B1 | 5/2018 | Laborde | |
| 10,009,429 B2 | 6/2018 | Manchado | |
| 10,127,746 B2 | 11/2018 | Bergdale et al. | |
| 10,163,124 B2 | 12/2018 | Horowitz et al. | |
| 10,178,166 B2 | 1/2019 | Sharan | |
| 10,248,905 B1 | 4/2019 | Beatty | |
| 10,594,774 B2 | 3/2020 | Thomas | |
| 10,942,913 B1 | 3/2021 | Khoyilar et al. | |
| 11,074,543 B1 | 7/2021 | Rudeegraap et al. | |
| 11,461,425 B2 | 10/2022 | Fowler et al. | |
| 11,468,138 B2 | 10/2022 | Fowler et al. | |
| 11,838,587 B1 * | 12/2023 | Ensing ............... H04N 21/4532 | |
| 2001/0050310 A1 | 12/2001 | Rathus et al. | |
| 2002/0016816 A1 | 2/2002 | Rhoads | |
| 2003/0008661 A1 | 1/2003 | Joyce et al. | |
| 2003/0041155 A1 | 2/2003 | Nelson et al. | |
| 2006/0077253 A1 | 4/2006 | VanRiper et al. | |
| 2006/0094409 A1 | 5/2006 | Inselberg | |
| 2007/0229217 A1 | 10/2007 | Chen et al. | |
| 2009/0085724 A1 | 4/2009 | Naressi et al. | |
| 2009/0112683 A1 | 4/2009 | Hamilton, II et al. | |
| 2009/0138920 A1 | 5/2009 | Anandpura et al. | |
| 2009/0189982 A1 | 7/2009 | Tawiah | |
| 2009/0222336 A1 | 9/2009 | Etheridge, Jr. et al. | |
| 2010/0077429 A1 | 3/2010 | Kim et al. | |
| 2010/0184462 A1 | 7/2010 | Lapstun et al. | |
| 2010/0228577 A1 | 9/2010 | Cunningham et al. | |
| 2010/0245083 A1 | 9/2010 | Lewis | |
| 2010/0279710 A1 | 11/2010 | Dicke et al. | |
| 2011/0034252 A1 | 2/2011 | Morrison et al. | |
| 2011/0270618 A1 | 11/2011 | Banerjee et al. | |
| 2012/0011015 A1 | 1/2012 | Singh et al. | |
| 2012/0130770 A1 | 5/2012 | Heffernan | |
| 2012/0162436 A1 * | 6/2012 | Cordell ............ H04N 21/23109 348/158 |
| 2012/0233237 A1 | 9/2012 | Roa et al. | |
| 2012/0280784 A1 | 11/2012 | Gaviria Velez et al. | |
| 2013/0043302 A1 | 2/2013 | Powlen et al. | |
| 2013/0073366 A1 | 3/2013 | Heath | |
| 2013/0080218 A1 | 3/2013 | Wildern, IV et al. | |
| 2013/0085834 A1 | 4/2013 | Witherspoon, Jr. et al. | |
| 2013/0166384 A1 | 6/2013 | Das | |
| 2013/0218721 A1 | 8/2013 | Borhan et al. | |
| 2013/0275221 A1 | 10/2013 | Zeto, III et al. | |
| 2013/0297430 A1 | 11/2013 | Soergel | |
| 2013/0311214 A1 | 11/2013 | Marti et al. | |
| 2014/0039945 A1 | 2/2014 | Coady et al. | |
| 2014/0046802 A1 | 2/2014 | Hosein et al. | |
| 2014/0058886 A1 | 2/2014 | Gopalakrishnan et al. | |
| 2014/0156752 A1 | 6/2014 | Fetyko | |
| 2014/0217164 A1 * | 8/2014 | Sweeney ............ G06Q 30/0601 235/375 |
| 2014/0278592 A1 | 9/2014 | Giampapa | |
| 2014/0279072 A1 | 9/2014 | Serino | |
| 2014/0282684 A1 | 9/2014 | Keen et al. | |
| 2014/0365574 A1 | 12/2014 | Franks et al. | |
| 2015/0012307 A1 | 1/2015 | Moss | |
| 2015/0067811 A1 * | 3/2015 | Agnew ............... H04L 63/0281 726/9 |
| 2015/0073879 A1 | 3/2015 | Acosta-Cazaubon | |
| 2015/0081532 A1 | 3/2015 | Lewis et al. | |
| 2015/0088658 A1 | 3/2015 | Iiduka et al. | |
| 2015/0112704 A1 | 4/2015 | Braun | |
| 2015/0120388 A1 | 4/2015 | Tan et al. | |
| 2015/0161684 A1 | 6/2015 | Raikula | |
| 2015/0279164 A1 | 10/2015 | Miller et al. | |
| 2015/0294392 A1 | 10/2015 | Sharon et al. | |
| 2015/0296347 A1 | 10/2015 | Roth et al. | |
| 2015/0304601 A1 | 10/2015 | Hicks et al. | |
| 2015/0348329 A1 * | 12/2015 | Carre ................ H04N 21/4782 345/633 |
| 2015/0379791 A1 | 12/2015 | Russell et al. | |
| 2016/0086228 A1 | 3/2016 | Babb et al. | |
| 2016/0104041 A1 | 4/2016 | Bowers et al. | |
| 2016/0104347 A1 | 4/2016 | Yang | |
| 2016/0132925 A1 | 5/2016 | Durst, Jr. et al. | |
| 2016/0189287 A1 | 6/2016 | Van Meter | |
| 2016/0191821 A1 | 6/2016 | Dwarakanath et al. | |
| 2016/0217258 A1 | 7/2016 | Pitroda et al. | |
| 2016/0260319 A1 * | 9/2016 | Jeffery .................... G08C 17/02 | |
| 2016/0282619 A1 * | 9/2016 | Oto ...................... G06F 3/012 | |
| 2016/0307379 A1 | 10/2016 | Moore, Jr. et al. | |
| 2016/0335565 A1 | 11/2016 | Charriere et al. | |
| 2016/0381023 A1 | 12/2016 | Dulce et al. | |
| 2017/0039599 A1 | 2/2017 | Tunnell et al. | |
| 2017/0142460 A1 | 5/2017 | Yang et al. | |
| 2017/0250006 A1 | 8/2017 | Ovalle | |
| 2017/0308692 A1 | 10/2017 | Yano | |
| 2017/0330263 A1 | 11/2017 | Shaffer | |
| 2017/0337531 A1 | 11/2017 | Kohli | |
| 2018/0025402 A1 | 1/2018 | Morris | |
| 2018/0026954 A1 | 1/2018 | Toepke et al. | |
| 2018/0075717 A1 * | 3/2018 | Reinbold ......... H04N 21/41265 | |
| 2018/0089775 A1 | 3/2018 | Frey et al. | |

(56) References Cited

U.S. PATENT DOCUMENTS

| | | |
|---|---|---|
| 2018/0276705 A1 | 9/2018 | Jay et al. |
| 2018/0288394 A1* | 10/2018 | Aizawa ............... H04N 5/2628 |
| 2018/0330327 A1 | 11/2018 | Hertenstein et al. |
| 2018/0336286 A1 | 11/2018 | Shah |
| 2018/0353999 A1 | 12/2018 | McGillicuddy et al. |
| 2018/0376217 A1* | 12/2018 | Kahng ............. H04N 21/41407 |
| 2019/0098504 A1 | 3/2019 | Van Betsbrugge et al. |
| 2019/0130450 A1 | 5/2019 | Lamont |
| 2019/0220715 A1 | 7/2019 | Park et al. |
| 2019/0311341 A1 | 10/2019 | Rice |
| 2019/0362601 A1 | 11/2019 | Kline et al. |
| 2019/0385128 A1 | 12/2019 | Cummings |
| 2020/0035019 A1* | 1/2020 | Cappello ................... G06T 7/75 |
| 2020/0066129 A1 | 2/2020 | Galvez et al. |
| 2020/0104601 A1* | 4/2020 | Karoui ............... H04N 5/23203 |
| 2020/0184547 A1 | 6/2020 | Andon et al. |
| 2020/0213006 A1 | 7/2020 | Graham et al. |
| 2020/0236278 A1 | 7/2020 | Yeung et al. |
| 2020/0320911 A1 | 10/2020 | Bruce |
| 2020/0327997 A1 | 10/2020 | Behrens et al. |
| 2020/0413152 A1 | 12/2020 | Todorovic et al. |
| 2021/0019564 A1 | 1/2021 | Zhou et al. |
| 2021/0019715 A1 | 1/2021 | Stier et al. |
| 2021/0027402 A1 | 1/2021 | Davis et al. |
| 2021/0065256 A1 | 3/2021 | Shontz |
| 2021/0118085 A1 | 4/2021 | Bushnell et al. |
| 2021/0134248 A1* | 5/2021 | Wan ......................... G09G 5/12 |
| 2021/0247947 A1 | 8/2021 | Jaynes et al. |
| 2021/0248338 A1 | 8/2021 | Spivack et al. |
| 2021/0390509 A1 | 12/2021 | Fowler et al. |
| 2022/0060759 A1 | 2/2022 | Fowler et al. |
| 2022/0103885 A1 | 3/2022 | Sarosi et al. |
| 2022/0114228 A1 | 4/2022 | Fowler et al. |
| 2022/0116737 A1 | 4/2022 | White et al. |
| 2022/0167021 A1* | 5/2022 | French ............... H04N 21/2187 |
| 2022/0172128 A1 | 6/2022 | Lore |
| 2022/0188839 A1 | 6/2022 | Andon et al. |
| 2022/0248169 A1 | 8/2022 | Bettua et al. |
| 2022/0337898 A1* | 10/2022 | Dorogusker ..... H04N 21/47815 |
| 2022/0343451 A1* | 10/2022 | Fowler ................. H04N 21/472 |
| 2023/0117466 A1* | 4/2023 | Idris ..................... G07F 17/3239 463/29 |

FOREIGN PATENT DOCUMENTS

| | | |
|---|---|---|
| EP | 3550844 A1 | 10/2019 |
| FR | 3092195 A1 | 7/2020 |
| KR | 10-2015-0042885 A | 4/2015 |
| WO | WO/2006/011557 A1 | 2/2006 |
| WO | WO/2008/124168 A1 | 10/2008 |
| WO | WO/2013/120064 A1 | 8/2013 |
| WO | WO/2014/081584 A1 | 5/2014 |
| WO | WO/2014/112686 A1 | 7/2014 |
| WO | WO/2015/035055 A1 | 3/2015 |
| WO | WO/2016/041018 A1 | 3/2016 |
| WO | WO/2019/016602 A2 | 1/2019 |

OTHER PUBLICATIONS

International Search Report issued in International Application No. PCT/US2022/071913 dated Jun. 15, 2022.
International Search Report issued in International Application No. PCT/US2021/070471 dated Jun. 28, 2021.
International Search Report issued in International Application No. PCT/US2022/071909 dated Aug. 3, 2022.
International Search Report issued in International Application No. PCT/US2022/071912 dated Jul. 6, 2022.
International Search Report issued in International Application No. PCT/US2022/071938 dated Jul. 6, 2022.
International Search Report issued in International Application No. PCT/US2022/071906 dated Jul. 7, 2022.
International Search Report issued in International Application No. PCT/US2022/071910 dated Jul. 7, 2022.
International Search Report issued in International Application No. PCT/US2022/071908 dated Aug. 8, 2022.
International Search Report issued in International Application No. PCT/US2022/071915 dated Jul. 8, 2022.
"Blockchain", Wikipedia, Sep. 27, 2019.
"URL Redirection", Wikipedia, Mar. 21, 2021.
"Web Template System", Wikipedia, Mar. 21, 2021.
Garg, "QR Codes in Sporting Goods Companies: Eight Use Cases Across the Industry", Scanova Blog, Dec. 11, 2019, https://scanova.io/blog/qr-codes-sporting-goods-companies/.
"QR Codes: Here They Come, Ready or Not", Printing Tips: Precision Printing Newsletter, vol. 1, No. 1, May 2011.
McLaren, "Women's Beach Volleyballers Sign Deal to Display QR Code on Their Rears!", Digital Sport, Aug. 9, 2011, https://digitalsport.co/women%E2%80%99s-beach-volleyballers-sign-deal-to-display-qr-code-on-their-rears.
Unruh, "OU's Sooner Schooner Will Run on Field as Football Gameday Traditions Remain in New Ways: "We Feel Like We Can Safely Do That"", The Oklahoman, Sep. 10, 2020, https://www.oklahoman.com/story/sports/columns/2020/09/10/sooner-schooner-will-run-field-football-gameday-traditions-remain-new-ways-feel-like-can-safely-that/60383091007/.
Muthukumar, et al., "QR Code and Biometric Based Authentication System for Trains", IOP Conference Series: Materials Science and Engineering, vol. 590, art. 012010, 2019, 1-7.

* cited by examiner

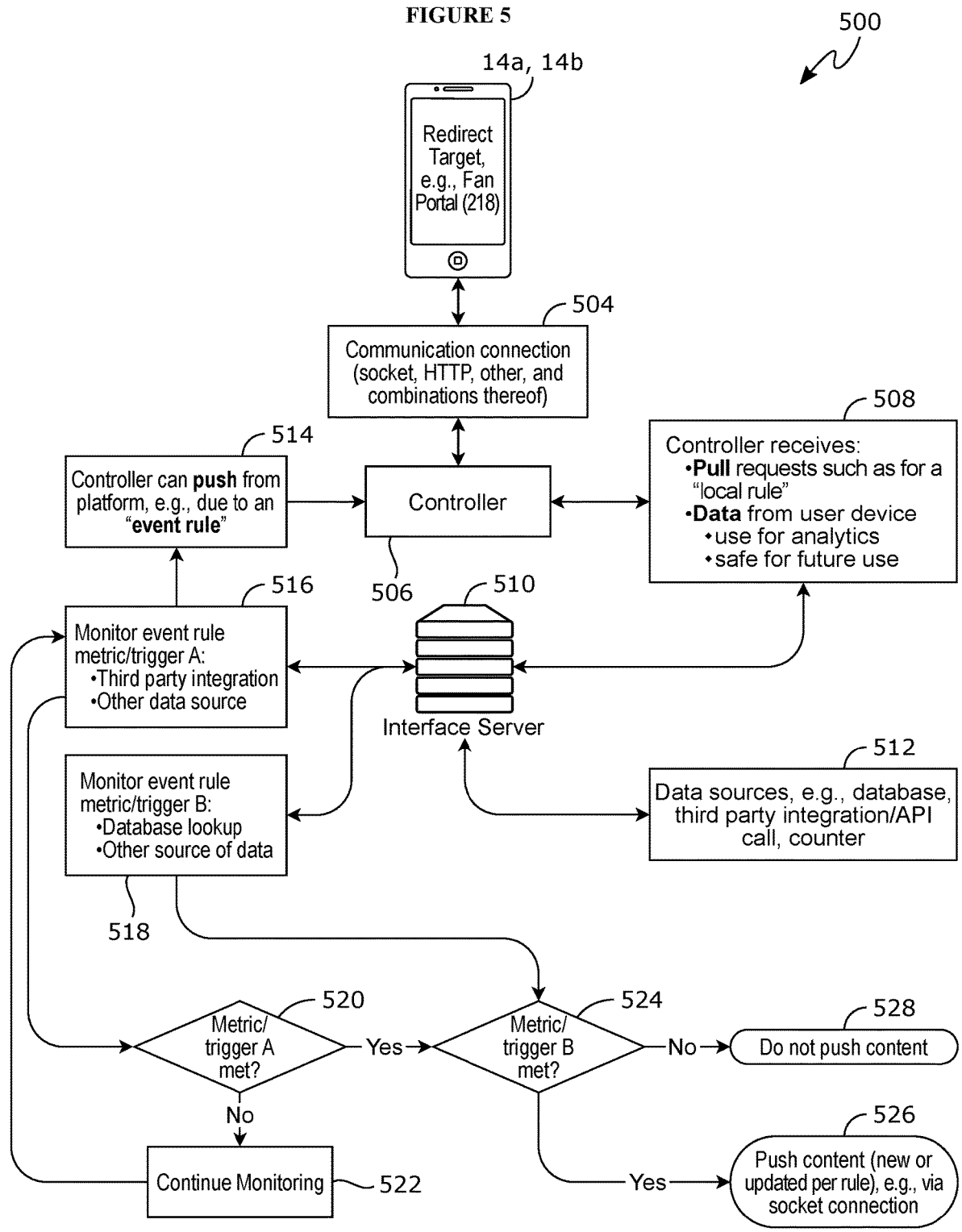

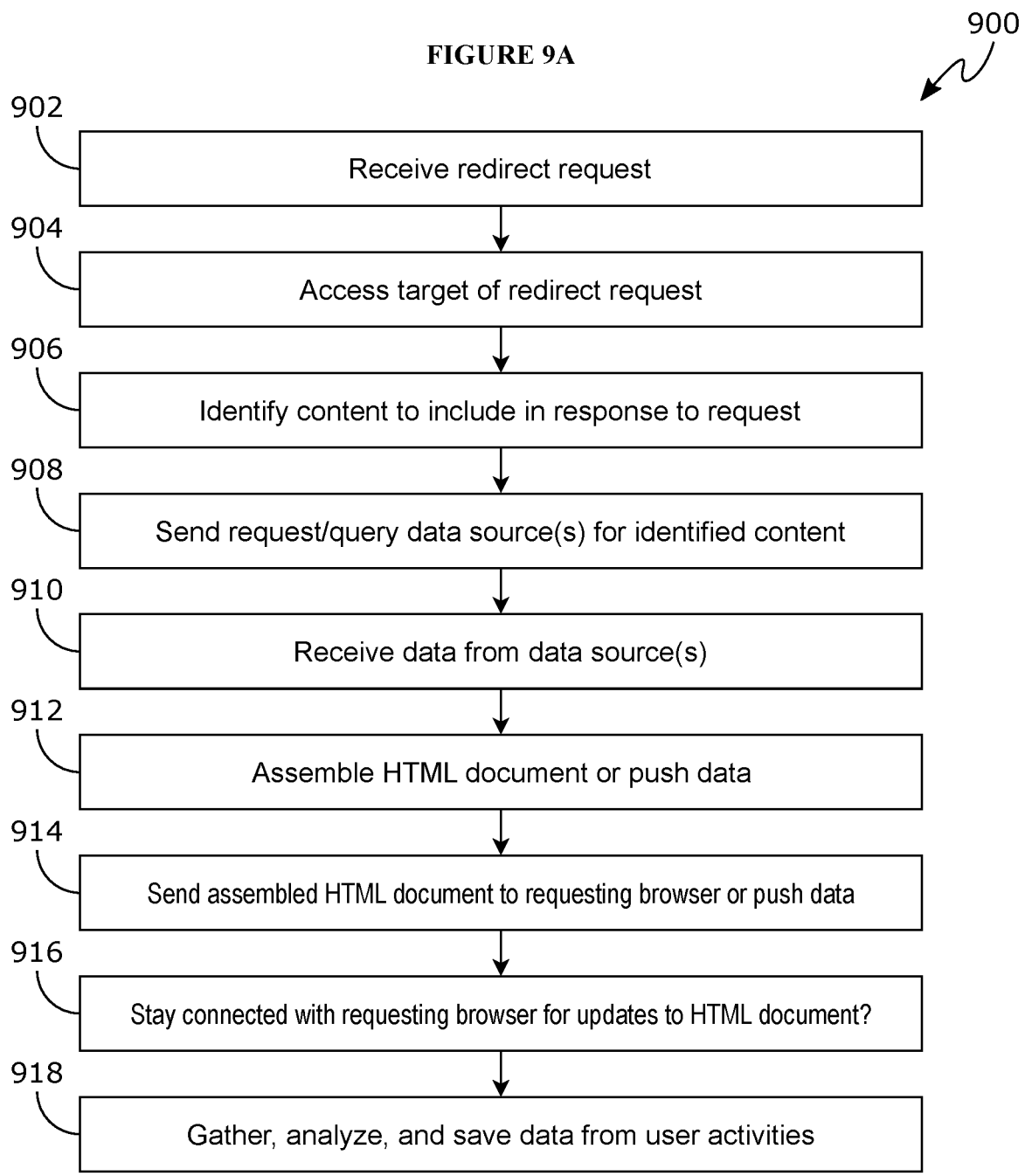

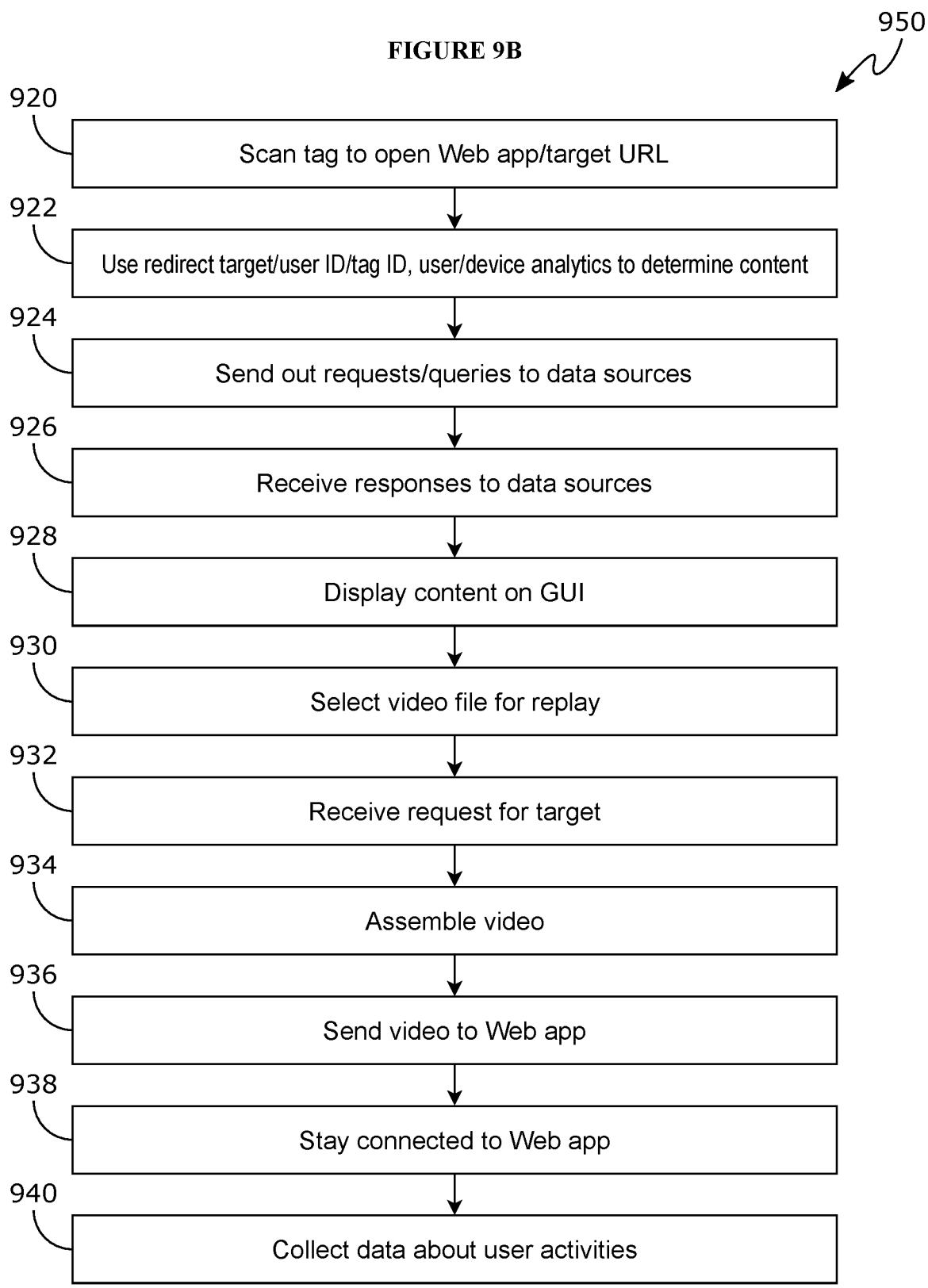

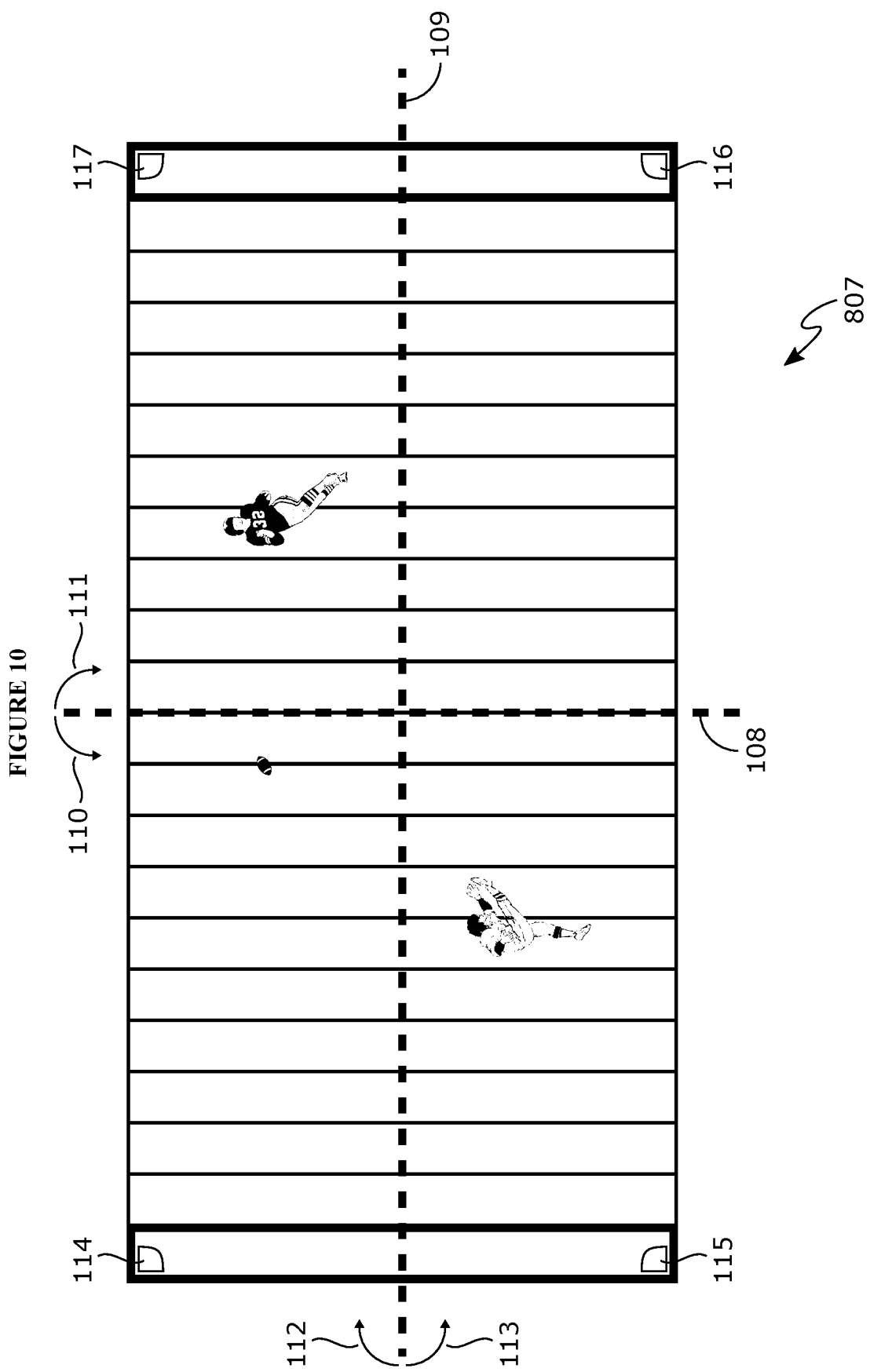

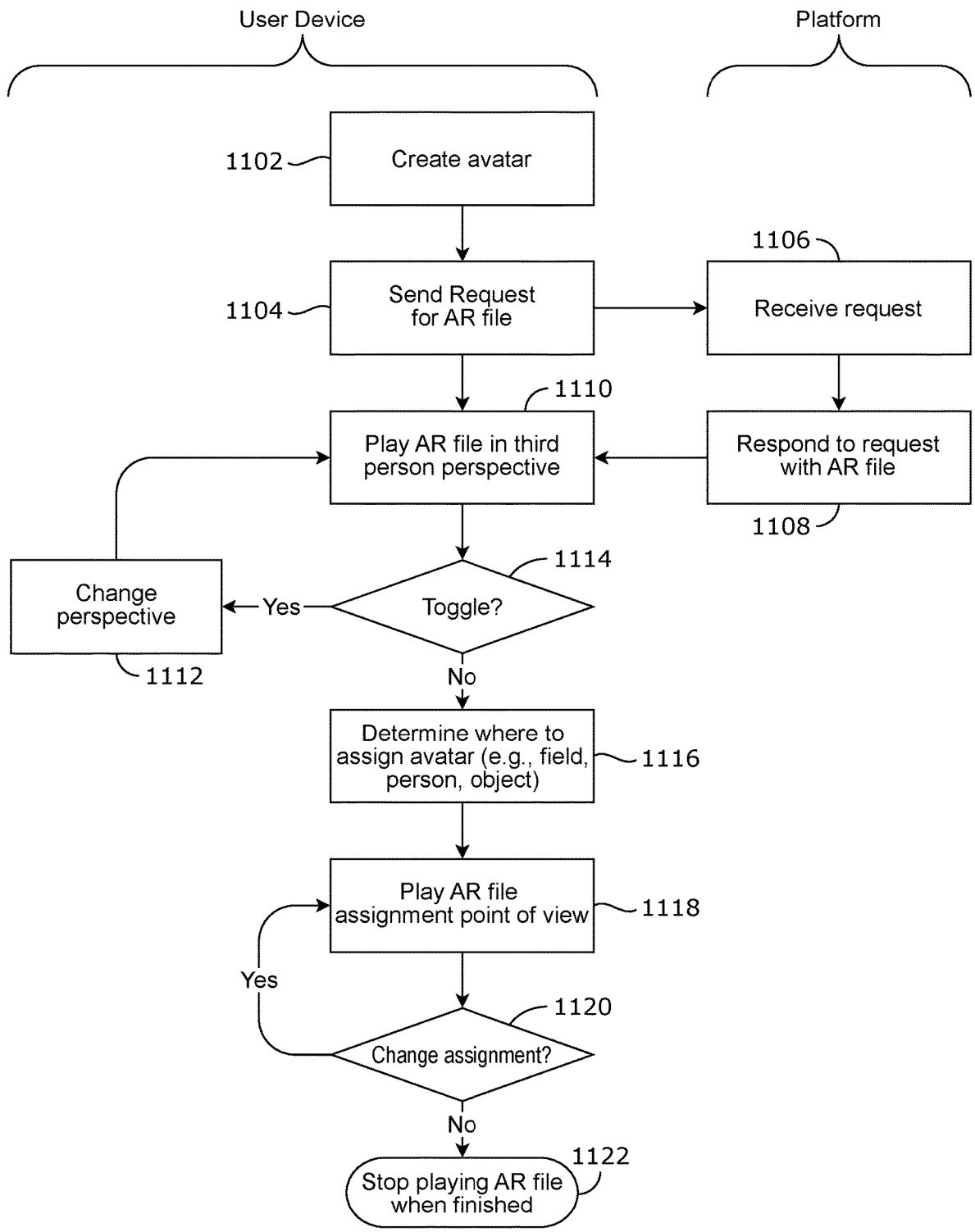

SYSTEMS AND METHODS FOR DELIVERING AUGMENTED REALITY CONTENT

CROSS-REFERENCE TO RELATED APPLICATIONS

This application claims the benefit of U.S. Provisional Patent Application No. 63/201,374 filed on Apr. 27, 2021, U.S. Provisional Patent Application No. 63/201,373 filed on Apr. 27, 2021, U.S. Provisional Patent Application No. 63/201,376 filed on Apr. 27, 2021, U.S. Provisional Patent Application No. 63/269,015 filed on Mar. 8, 2022, all with the United States Patent and Trademark Office, the contents of which are incorporated herein by reference in their entirety.

FIELD OF THE INVENTION

The invention is related to video, augmented video, and interaction with video in various medium.

BACKGROUND OF THE INVENTION

Video has changed the way in which we interact with events. Whether the event is an athletic event, a musical performance, theater, or some other event, the ability to capture and replay the event, typically with a smartphone or other small hand-held device, has dramatically altered the consumption of these performances.

Consumers today want more than just a replay, however. They desire to re-live the event or to capture it in a unique way that they did not perceive with their own eyes. This includes using slow-motion, changing the sounds or pitch of the audio feed, and participating in the event through modification of the video files.

The advent of high-speed video cameras, high-definition video, and other video and sensor-based imagery allows for further modification of a video feed. This is particularly noticeable in these event venues and especially as it relates to sports.

Instant replays in sporting events have become an integral part of the fan viewing experience. Video production for televised and internet streaming events provides multiple camera angle replays and sophisticated graphical analysis overlays to enhance the viewing experience. Furthermore, with current streaming and digital video recording technology, the viewer is able to rewind the live feed to access the instant replay multiple times, if necessary. Commentators frequently draw on a replay and identify action that occurred or identify what a player should have or could have done instead of what occurred. Furthermore, information such as speed, distance travelled, and other metrics that provide more in-depth viewing experiences can be overlaid onto the video as supporting information or analysis.

The live, in-venue experience lacks access to the production quality replay as fans are most likely limited to the instant replay disseminated over the venue's multimedia system such as a jumbotron or video monitors. Additionally, the live, in-venue experience does not allow fans to access graphical analysis overlays, analytics and telemetry that they would otherwise be provided in a video production. These are major setbacks for consumers who now expect and demand sophisticated video options related to the event they are enjoying.

The method and systems defined herein details new and unique manners in which the systems can be utilized to generate augmented video feeds. Specifically, these feeds can be accessed through user devices such as mobile devices and can further modify the fan experience.

SUMMARY OF THE INVENTION

The embodiments herein are directed to augmented video and to access of said augmented video through the use of Machine-Readable Codes ("MRC"). Such embodiments allow for a unique approach towards accessing the augmented video, generating content within the augmented video, and accessing additional content within the system.

In a preferred embodiment, an augmented video system comprising: a server, a plurality of video cameras, a database, and software capable of being operated on said server; wherein, said plurality of video cameras capturing a moment in time, wherein each of said plurality of video cameras capturing a video file of said moment in time from a different perspective and storing each of said video files in a database device; wherein said software combines each of said video files into a single combined video file; and said combined video file being directed back to the server and said server generating a link to said combined video file; said combined video file being operably viewable as a video file on user device. In a further preferred embodiment, the augmented video system wherein said combined video file can be modified by a user to change the perspective view of the video file.

In a further preferred embodiment, the augmented video system comprising a tag with a machine-readable code, wherein the augmented video is accessed by scanning the machine-readable code; wherein the action of scanning the machine-readable code on the tag generates a URL encoded to the tag; wherein the URL is connected to said server; and wherein opening the URL displays the augmented video.

In a further preferred embodiment, the augmented video system wherein the server further identifies the user device or a user within the system. In a further preferred embodiment, the augmented video system wherein the server further identifies user analytics.

In a further preferred embodiment, the augmented video system wherein the plurality of video cameras is selected from the group consisting of: high resolution, high-frame rate video cameras, volumetric video capture hardware, depth sensing cameras, ultra high FPS machine vision cameras, LIDAR sensors, LIDAR enabled cameras, and combinations thereof.

In a further preferred embodiment, the augmented video system wherein the user is added into the video via an avatar. In a further preferred embodiment, the augmented video system wherein the avatar participates in the video. In a further preferred embodiment, the augmented video system wherein the avatar perspective modifies the video perspective to a first-person view of the video based upon the placement of the avatar within the video.

In a further embodiment, a method of viewing a video replay in augmented reality comprising: capturing a moment of time on a plurality of video cameras, said plurality of video cameras each capturing the same moment in time from a different perspective to create a plurality of video files; stitching the plurality of video files together from the plurality of video cameras to create an augmented video file; replaying the moment of time from the augmented video file on a computing device; said replay generated by scanning a tag with a machine-readable code; said scanning engages with a server to generate a URL that comprises the augmented video file for viewing; displaying the augmented video file on a user device; and modifying the visual angle of view of the augmented video file by rotating the user device along the horizontal or vertical axis; wherein rotating along the vertical axis rotates the view of the augmented video file around the viewer in the vertical axis; and wherein rotating along the horizontal axis, rotates the view along the horizontal axis.

In a preferred embodiment, an augmented video system comprising: a machine-readable code, a user device, a server, a plurality of video cameras, a database, and software capable of being operated on said server; wherein said plurality of video cameras capture a moment in time, each of said plurality of video cameras capturing a video file of said moment in time from a different perspective and storing each of said video files in said database; wherein said software combines each of said video files into a combined video file; and wherein said user device, upon accessing the augmented video system via the machine-readable code, generates a request to said server to view the combined video file, said combined video file being directed back to the server in an assembled form; said combined video file being operably viewable as a video file on said user device.

In a further embodiment, the augmented video system wherein said combined video file can be modified by a user to change the perspective of the combined video file. In a further embodiment, the augmented video system wherein the combined video file being modified is performed by a rotation of the user device along a horizontal axis or a vertical axis. In a further embodiment, the augmented video system wherein the combined video file being modified by a user is performed by touching a button operable to the user device. In a further embodiment, the augmented video system wherein the button operable to the user device is on a screen of said user device.

In a further embodiment, the augmented video system wherein said machine-readable code is defined on a tag, wherein the combined video file is accessed by scanning the tag; wherein scanning the tag generates a URL encoded to the tag; wherein the URL is connected to said server; and wherein opening the URL displays the combined video file. In a further embodiment, the augmented video system wherein the server further identifies the user device or a user within the augmented video system. In a further embodiment, the augmented video system wherein the server further identifies user analytics, said user analytics stored in a database and corresponding to a unique ID assigned to said user device.

In a further embodiment, the augmented video system wherein the plurality of video cameras is selected from the group consisting of: high resolution, high frame rate video cameras, volumetric video capture hardware, depth sensing cameras, ultra-high FPS machine vision cameras, LIDAR sensors, LIDAR-enabled cameras, and combinations thereof.

In a further embodiment, the augmented video system wherein an augmented video comprises an avatar added to the combined video file. In a further embodiment, the augmented video system wherein the avatar participates in the augmented video by replacing one or more elements within the augmented video. In a further embodiment, the augmented video system wherein the augmented video is displayed by an avatar perspective, wherein the avatar perspective modifies the perspective of the augmented video to a first-person view of the augmented video based upon placement of the avatar within the augmented video.

In a preferred embodiment, a method of viewing a video replay in augmented reality comprising: (a) capturing a moment in time on a plurality of video cameras, said plurality of video cameras each capturing the same moment in time from a different perspective to create a plurality of video files; (b) stitching the plurality of video files together from the plurality of video cameras to create a combined video file; (c) generating a replay from the combined video file on a user device by scanning a tag; (d) in response to scanning the tag, generating a URL by receiving a request for a video file at a server; (e) accessing a target of a redirect request; (f) identifying a content of said combined video file to be included in said request; (g) receiving data from a database including said content; (h) assembling the combined video file; (i) sending said combined video file to said user device; and (j) accessing said combined video file on said user device.

In a further embodiment, the method further comprising: modifying a visual angle of the combined video file by receiving at said user device a rotation along a horizontal axis or a vertical axis; wherein rotating along the vertical axis rotates the viewing of the combined video file around a viewer in the vertical axis; and wherein rotating along the horizontal axis rotates the viewing of the combined video file along the horizontal axis.

In a preferred embodiment, a method of generating an avatar within a visual replay comprising: (a) uploading, within a database, a digital file defining an avatar; (b) in response to scanning a tag with a user device, generating a URL by receiving a request for a combined video file at a server; (c) accessing a target of a redirect request; (d) identifying a content of said combined video file to be included in said request; (e) inserting said avatar within said combined video file; (f) receiving data from a database including said content; (g) assembling the combined video file; (h) sending said combined video file to said user device; and (i) accessing said combined video file on said user device.

In a preferred embodiment, a method of overlaying information on a video file comprising: (a) generating a combined video file at a user device by scanning a tag; (b) in response to scanning the tag, generating a URL by receiving a request for a video file at a server; (c) accessing a target of a redirect request; (d) identifying a content of said combined video file to be included in said request; (e) receiving data from a database including said content, wherein said data includes a set of data to be superimposed over the video file; (f) assembling the combined video file; (g) sending said combined video file to said user device; and (h) accessing said combined video file on said user device.

In a further embodiment, the method wherein the set of data to be superimposed over the video file provides live statistics regarding one or more players viewed within the combined video file.

In a preferred embodiment, a system for generating automatic replays within a venue comprising: (a) capturing a moment in time on a plurality of video cameras, said plurality of video cameras each capturing the same moment in time from a different perspective to create a plurality of video files; (b) stitching the plurality of video files together from the plurality of video cameras to create a combined video file; (c) generating a replay from the combined video file on a user device by scanning a tag; (d) in response to scanning the tag, generating a URL by receiving a request for a video file at a server; (e) accessing a target of a redirect request; (f) identifying a content of said combined video file to be included in said request; (g) receiving data from a database including said content; (h) assembling the combined video file; (i) sending said combined video file to said user device; and (j) accessing said combined video file on said user device.

In a further embodiment, the system wherein a GUI defines a list of one or more video files to be viewed. The system wherein the combined video file to be viewed is selected from the GUI, wherein selection from the GUI sends a request to the server to access the combined video file, and wherein the combined video file is assembled and delivered to said user device.

In a preferred embodiment, a method for using a sensor on a user device to generate overlay information on a video feed of said sensor comprising: (a) capturing a live video feed from a camera selected from a user device camera or a second camera; (b) overlaying, within said video feed, data from a plurality of video cameras, said plurality of video cameras each capturing the same moment in time from a different perspective to create a plurality of video files; (c) stitching the plurality of video files together from the plurality of video cameras to create a combined video file; (d) generating a replay from the combined video file on a user device by scanning a tag; (e) in response to scanning the tag, generating a URL by receiving a request for a video file at a server; (f) accessing a target of a redirect request; (g) identifying a content of said combined video file to be included in said request; (h) receiving data from a database including said content; (i) assembling the combined video file; (j) sending said combined video file to said user device; and (k) accessing said combined video file on said user device.

BRIEF DESCRIPTION OF THE FIGURES

FIG. 5 depicts an embodiment of a system wherein the system is enabled to push or pull data or information or due to triggering events or rules to modify or augment a target delivered to a user device.

FIG. 9A depicts a flowchart of the diagram of FIG. 8 wherein an augmented video experience is automatically generated within the platform by the administrator of the platform.

FIG. 9B depicts a flowchart of an augmented video experience related to FIG. 8 wherein a video experience is generated based on a selected input from a GUI by an end user.

FIG. 10 depicts an augmented video and performance functionalities therein.

FIG. 11B depicts a flow diagram of the modification of an augmented video.

DETAILED DESCRIPTION OF THE INVENTION

Figure 1:
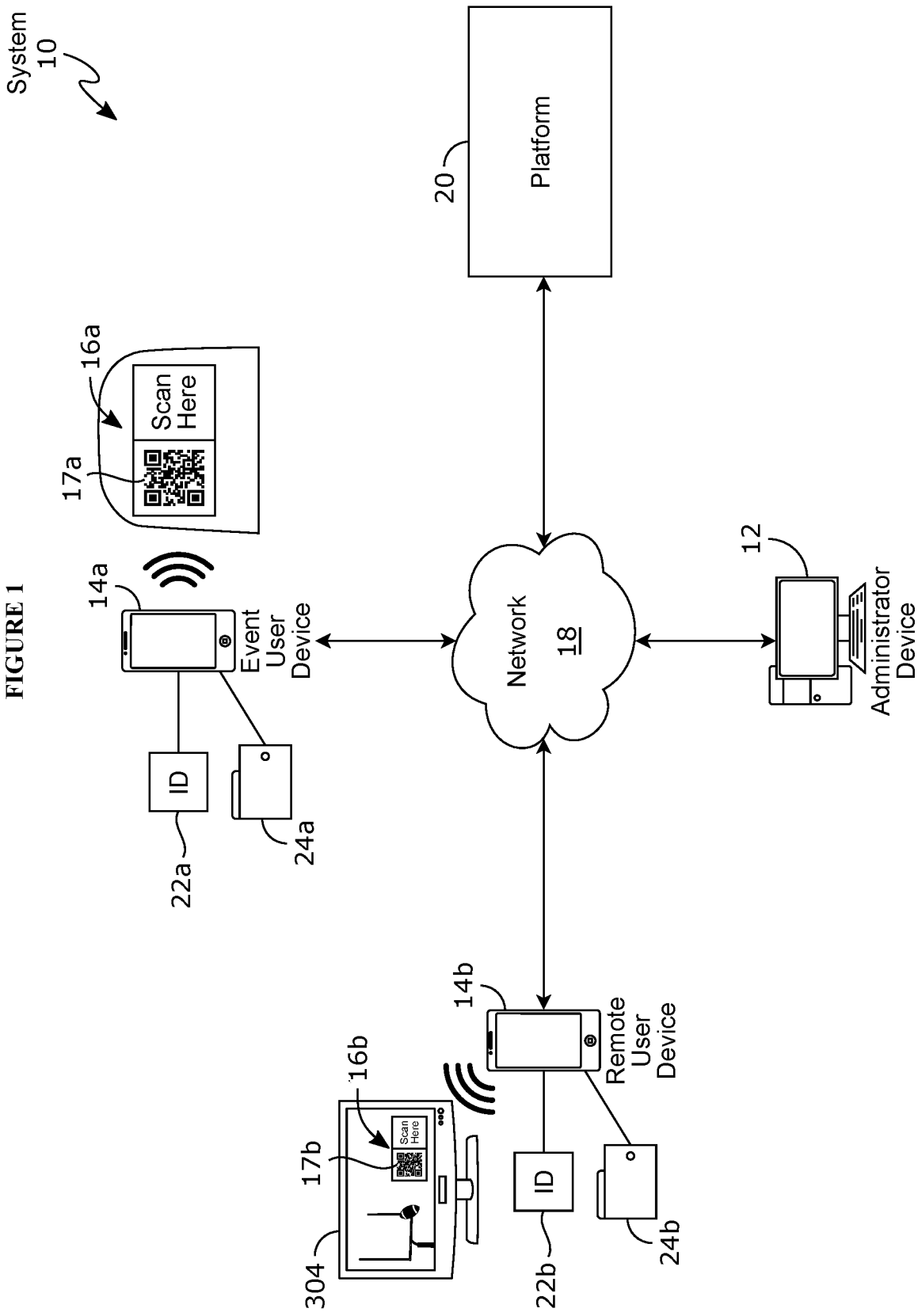
FIG. 1 depicts an embodiment of a system for user device generated interactions with a system and platform for accessing and viewing targets, such as augmented video.

Various embodiments are described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, devices, or any similar or equivalent arrangements known to those skilled in the art. Accordingly, the various embodiments may take the form of an entirely hardware embodiment, an entirely software embodiment or an embodiment combining software and hardware aspects. The following detailed description is, therefore, not to be taken in a limiting sense.

Video replay is a critical element in consumption of live events. A video replay can be a simple as re-playing the entire live event or can be more nuanced as a replay of a key moment in the live event.

As used herein, a live event is an event that is captured by video recording by another. This is typically something like a sports game, a sporting practice, a visual performance, a visual performance practice, etc. In sports, for example, video of a game is frequently used to review the plays and to dissect the positive and the negative aspects of the play. Then, individual plays can specifically highlight specific elements and a user or a player in this instance can practice certain elements to improve upon the negative and reinforce the positive.

In a sporting practice, a user may take a particular element and replay to visualize the elements of a moment. Take a baseball swing as an example. Video from a game can be captured to record how a particular player swung at a pitch during a baseball game. Tendencies can be dissected and a plan to modify or improve tendencies can be enacted. A player can then swing during a practice, capture video of the practice, and then re-play the practice video to reinforce the learning of the tendencies to be modified.

As used herein, the below terms will have the following meanings as may be supplemented elsewhere in this specification:

As used in this application, the words "a," "an," and "one" are defined to include one or more of the referenced items unless specifically stated otherwise. The terms "approximately" and "about" are defined to mean ±10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

ADDRESS: Code used to direct a user device, browser, Web app, progressive Web app, administrator device, server, database, API, tool, software, etc., to a resource within the system or a network. Non-limiting examples of addresses include a uniform resource identifier (URI) or a uniform resource locator (URL).

ADMINISTRATOR: The individual or group of individuals with the ability to control and set rules and parameters within the system. This could be a third-party administrator, the proprietor, the venue, the owner of the tags, the team or performer participating in the event, a designated employee of any of the foregoing, etc.

ADMINISTRATOR DEVICE: Any type of mobile or non-mobile processing device such as a desktop computer, handheld computer (e.g., phone, smartphone, tablet, personal digital assistant), wearable computer (e.g., smart watch, smart glasses), portable computers (e.g., laptop, netbooks, Chromebook), or wearable or implantable device, and the like using wireless communication, a camera or other connectivity element that is accessible only to an administrator or proprietor or an employee designated by the administrator or proprietor.

ANALYTICS OR ANALYTICAL DATA: Data collected by the system or retrieved by the system via an API call to an external server or database. Non-limiting examples of analytical data include date, time, GPS location, personal identifying information, etc.

APPLICATION PROGRAMMING INTERFACE ("API"): An application programing interface or programming code that enables data transmission within the system, between the system's server and an external server or between one software product and another. Non-limiting examples of API connections to the system may be third-party vendor databases such as ticketing sales platforms, e-commerce sites such as merchandise sales, social media sites, or any other third-party software product that makes their API available for use by others.

API CALL—Computer code used by the system software to access data, server software or other applications within the system or external to the system, acting as an intermediary between any two devices or servers that want to connect with each other for a specified task. As used herein, API can mean (i) representational state transfer or Rest (RESTful) API; (ii) Simple Object Access Protocol ("SOAP") API; (iii) extensible markup language-Remote Procedure Calls ("XML-RPC"); (iv) JSON Remote Procedure Calls ("JSON-RPC"), (v) open API; (vi) partner API; (viii) internal or private API; (ix) composite API; or (x) any other API that is generally known, or will be come to be known in the art. Thus, the system frequently uses an API, or sends an API request, to an internal or external program, server, or database to deliver requested information.

BLOCKCHAIN: Any digitally distributed, decentralized, public or private ledger that exists across a network such as those offered by the providers including but not limited to Etherium, Binance Smart Chain, Polkadot, Flow by Dapper Labs, EOS, Tron, Tezos, WAX, Theta, etc.

BROWSER APPLICATION: An application that runs within the Web browser of a User Device or Computer. The instructions or executable code, typically written in a combination of HTML and JavaScript, is embedded within the Web page that is downloaded from a Web site.

COMPUTER: May be any type of computer such as a laptop computer, desktop computer, tablet, and the like, and includes the appropriate hardware, firmware, and software to enable the computer to function as intended.

CONTENT: Any type of information, images, videos, etc. Non-limiting examples of content can be a video file, an image file, text, executable code, a digital offer, a digital coupon, a digital wallet offer, an AR, VR or mixed reality filter, a game, a poll, an app, an NFT, etc. Content can be specifically formatted for optimal viewing on a user device.

CRYPTO CURRENCY: Any digital currency in which transactions are verified and records maintained on a distributed ledger such as blockchain, for example, Bitcoin, Ethereum, Cardano, Binance Coin, Tether, Solana, XRP, Dodgecoin, etc.

DATABASE MANAGEMENT SYSTEM: A software package designed to define, manipulate, retrieve and manage data in a database, or any other generally accepted definition known to those skilled in the art.

DIGITAL OFFER: Any incentive or reward, for example an incentive to purchase at a discounted price or a free giveaway, offered by a proprietor and delivered to users from a server to a user device through a variety of channels. A Digital offer can be code stored in the user's digital wallet, a MRC displayed in Web browser and presented to a proprietor for redemption, an e-mail with a unique redemption code, a text message, SMS/MMS, push notification or socket notification with a unique redemption code. Digital offers can be stored anywhere on a user device or can be downloaded or turned into physical offers by printing. Digital offers can be limited to a particular user, or a user may share the digital offer to other users. If a digital offer is shared, the same offer can be shared to multiple other users, or the digital offer can be modified by the system when it is shared. Digital offers can also be associated with a unique code that is stored in a database on a server internal or external to the system.

DIGITAL WALLET: A software-based system that securely stores users' information such as payment information, passwords, digital certificates, digital coupons, crypto currency, tokens, NFTs, digital ID such as a digital driver's license or passport, etc. A digital wallet can be a blockchain or crypto currency wallet. A digital wallet can be stored locally on any user device or can be cloud based and accessed by a user device. Digital wallet can also mean digital storage in general on any user device or computer. Digital wallet can also be referred to as a mobile wallet.

DISTRIBUTED DATABASE SYSTEM: Any database that consists of two or more files located in different sites either on the same network or on entirely different networks.

DISTRIBUTED LEDGER: Any database that is consensually shared and synchronized across multiple sites, institutions, or geographies, accessible by multiple people.

DATA SERVER OR SERVER: Any form of electronic device or plurality of devices having at least one computer processor, e.g., a central processing unit (CPU), and some form of computer memory having a capability to store data, as is well known in the art. The server may comprise hardware, software, and firmware for receiving, storing, and/or processing data as described below. The hardware may be in a single unit, or operably connected via a network. For example, a computer or server may comprise any of a wide range of digital electronic devices, including, but not limited to, a server, a desktop computer, a laptop, a smart phone, a tablet, a smart watch, smart glasses, a wearable device or an implantable device or any form of electronic device capable of functioning as described herein.

DYNAMIC ELEMENT: An element that is updated, altered, customized, etc., in response to a change in the status of a metric, trigger, or any other datapoint as determined by the system. A non-limiting example of a dynamic element is the score of a game. If a goal is completed, then the score is updated to reflect this change.

EVENT: Non-limiting examples of an event include a professional, amateur or intermural sporting events (i.e., football, baseball, hockey, basketball, soccer, rugby, or cricket game, tennis or golf match, track and field or figure skating event, or automobile race), a theatrical performance (play, musical or opera), a musical concert, elementary school, middle school, high school, college or university event, a service or ceremony (i.e., religious or worship), a tradeshow or conference, guided or self-guided tours (museums, galleries and historical site), time spent in a venue such as a visit to a zoo or amusement park, etc.

FAN PORTAL: A GUI, such as a homepage, displayed in the browser of a user device that provides links or access to other pages/modules via buttons or other means of selecting options from a menu of choices. The fan portal can also be used for viewing content and receiving digital offers.

INTERFACE SERVER: Within the system, a program, executable code or API stored on a physical server, cloud storage system or in a serverless environment such as Amazon Web Services, that is capable of communicating with other servers, databases and API's internal or external to the system. The interface server is able to make and receive calls, request and receive data, or execute other functions within systems. The interface server is also capable of running AI and/or utilizing machine learning.

GEOFENCE: A virtual perimeter for a real-world geographic area or an area in or around a venue.

GUI OR GRAPHICAL USER INTERFACE: A graphical interface to enable interactions between a user and the user's device, such as but not limited to an interface to the Web app.

JUMBO SCREEN: Any display within a venue visible to users attending an event at a venue. The jumbo screen can be one display or multiple displays within the venue that can be controlled by the venue. Jumbo screen may also be known as a jumbotron.

LOCATION: An area whose perimeter or parameters are defined in an abstract way without boundaries that are clearly visible to users or proprietors. Non-limiting examples of a location include a town, city, state, country, region, continent, time zone, or geofenced area.

MACHINE-READABLE CODE ("MRC"): A barcode, a quick response (QR) code, near-field communication (NFC) code, radio-frequency identification (RFID) code, universal product code (UPC), machine readable graphics (e.g., having a pattern, matrix, or the like) coding, instructions coded on a chip, or combinations thereof. A MRC may be may be included into (i) a tag that is mounted to a surface, (ii) identification badges such as, for example, student identification badges, employment identification badges, concert badges, and the like, (iii) merchandise such as t-shirts, sweatshirts, hats, mugs, glasses, posters, CD's, and the like, (iv) a piece of paper, cardstock, or plastic that is handed to users, (v) a video stream viewed over the internet or network television channel, (vi) an LCD/LED/e ink display device embedded, attached or affixed to a surface.

MANIFEST: A file containing metadata for a group of accompanying files that are part of the system that instruct the user device how to handle the system when it is started.

MINTING: Uniquely publishing a token on the blockchain to make it purchasable, saleable, or tradeable.

NON-FUNGIBLE TOKEN ("NFT"): A non-interchangeable unit of data stored on a digital ledger, such as but not limited to blockchain, that can be purchased, sold, auctioned, and traded. As used herein, NFT includes the contract and subject matter associated with the NFT and can also mean semi-fungible token, fractional NFT. Non-limiting examples of the smart contracts that could govern a NFT include (i) 1/1 NFTs—known as ERC-721 tokens on Ethereum and Polygon, KIP17 on the Klatyn blockchain; (ii) Semi-fungible NFTs—known as ERC-1155 tokens on Ethereum and Polygon, KIP37 on Klatyn.

NFT MARKETPLACE: A platform where NFTs can be stored, displayed, bought, sold, traded, auctioned and in some cases minted.

PROPRIETOR: Any person or entity who purchases, subscribes to, or otherwise uses the system and/or platform and who is not a user. A Proprietor may or may not have administrative privileges to the system. Non-limiting examples of proprietors include, venue owners, event promotors, teams, performers, theatre troupes, religious organizations, educational institutions (i.e., elementary school, middle school, high school, college, university), restaurants, bars, retail establishments, amusement parks, museums, art galleries, advertisers, media outlets (i.e., network television, cable television, radio, internet broadcasts), hospitals and health care systems, ticketing platforms, airlines, ride share services, etc.

PROPRIETOR PORTAL: An access point for a proprietor to enter the system and/or platform typically displayed in a browser.

RECORD: Information that is stored in an electronic or other intangible medium without limitations on how the data is structured.

REDIRECT/IDENTIFICATION SERVER: The server within the system that makes a determination on if a user and/or user device that has entered the system is unique, by locating the manifest stored on a user device and if a manifest exists, associating the unique ID stored in the manifest on the user device with the database of known unique ID's stored on the redirect/identification server, or for confirming other data based on one or more requests to the redirect/identification server.

REDIRECT URL: An address generated by a server, such as the redirect/identification server or the interface server, in response to an incoming request that points the browser on a user device to a different target.

RESOURCE RECORD: A database record associated with a tag ID.

REQUEST: A message sent by one device to another (e.g., phone to server, server to server, computer to server, server to database, etc.) using an address to send the request. For example, upon selecting from the options available in the Web browser, the selection is coded into a request that the Web browser sends to the server via an address. The request typically provides instructions to the server. Non-limiting examples of a request can be—GET, POST, PUT, DELETE, CONNECT, OPTIONS, etc.

RULE: A set of conditional statements that tells the system how to react to a particular situation. Rules can be preprogramed into the system or can be set or changed by an administrator or proprietor.

SYSTEM: The network, tags, platform, etc.

TAG: A physical (e.g., tangible) form, a digital (e.g., virtual/intangible) form, or may be combinations of both forms that contains an MRC. Physical versions of tags may be constructed from diverse types of materials. The MRC may be printed, etched, or fabricated onto the tag materials such as paper, glass, plastic, metal, fabric, and the like as a few nonlimiting examples. In the case of tags that contain MRC's that are NFC or RFID, the tags may be adhered to, attached to, embedded in, or fabricated on (or combinations thereof) a natural or manmade material such as metal (e.g., aluminum, stainless steel), wood, polymer (e.g., plastic), film, glass, and combinations thereof. The material may then be incorporated into or affixed (e.g., adhesive or other form of attachment) to an object or location. A tag may be printed on a single or multiple use badge or ticket. Digital tags may include LED/LCD screens or a designated location within a video stream in which the MRC is located.

TAG ID: A unique identifier for the MRC affixed to the tag. The unique identifier can be any combination of letters, numbers, and symbols. The tag ID is stored in a database on a server and is coded with information specific to the location of the tag. For example, the tag ID might generally identify the geographic location of the tag (i.e., the United States, Pennsylvania and/or Philadelphia), the general venue location of the tag (i.e., Fenway Park, Madison Square Garden, Carnegie Hall, The Natural History Museum), the specific location of the tag within the venue (i.e., Section A, Row 1, Seat 10, next to Van Gogh's "Starry Night"), or any combination of information.

TAG URL: A unique address assigned to the MRC on each tag that may optionally include the tag ID.

TARGET: A Web page, file, address, GUI, Web app, progressive Web app, portal, content, or digital offer delivered to a user device. Those skilled in the art may also refer to a target as an endpoint.

TARGET DETERMINATION PROCESS: The process described in FIG. 5.

TARGET ID: A unique identifier for the Target. The unique identifier can be any combination of letters, numbers and/or symbols that can be stored in a database, on a server, and/or both. The target ID allows the platform to distinguish one target from another.

TICKETING PLATFORM: Both the primary ticketing platform and the secondary ticketing platform.

TRIGGER: The magnitude or condition that must be reached for a certain result to materialize. Triggers can be determined either by the system, an administrator, or a proprietor. Non-limiting examples of a trigger can be the start or end of an event, something of significance that occurs during the event (i.e., the 10$^{th}$ goal scored, the first encore by a musical act), a single user completing a certain task, or N-number of users completing a task.

TOKEN: A digital asset that is stored securely on the blockchain, representing a tradeable asset.

TOOLS: Cookies, pixels, widgets, plug-ins, etc.

UNIQUE ID: A unique identifier for the user device. The unique identifier can be any combination of letters, numbers and/or symbols, cookies, digital credentials, or it can be a digital certificate such as TLS, SSL, code signing certificate, client certificate, etc. . . . The unique ID can be stored on the user device in any location on the user device such as the manifest, local storage or digital wallet, in a database on a server, and/or both, and is used to associate the user device with the unique user record stored in a database on a server in the system.

UNIQUE IDENTIFYING INFORMATION: Personal information and demographics collected about a particular user's such as name, address, phone number, e-mail address, credit card information, gender, marital status, academic affiliation (student, faculty, alumni), driver's license number, age, username, password, pin number, social security number, bank account number, salary, etc.

USER DEVICE: Any type of mobile processing device such as a handheld computer (e.g., phone, smartphone, tablet, personal digital assistant), wearable computer (e.g., smart watch, smart glasses), portable computers (e.g., laptop, netbooks, Chromebook), or wearable or implantable device, and the like using wireless communication, a camera or other connectivity element.

VENUE: Any physical location with defined perimeters and parameters such as a stadium, arena, court, track, concert hall, theatre, course, museum, restaurant, place of worship (church, synagogue, temple, mosque, etc.), historical site, cultural site, amusement park, zoo, aquarium, conference center or any other place where events are held or users gather. Venues can also be hotel rooms, cruise ships, trains, airplanes, schools (elementary, middle or high school) or a college campus or dorm.

VIDEO OR VIDEO FILE: Any standard two-dimensional video, three-dimensional video, augmented reality video comprised of one or more video feeds stitched together or otherwise assembled, a mixed reality video file or any other generally accepted type of video currently known, or to be known in the art.

WEB APP: Executable code that is stored on a remote server and delivered via the system or a network to a browser interface on a user device. The Web app may facilitate communication between the user device and one or more servers such as the redirect/identification server or the interface server.

A high-level overview of an exemplary system (10) for capturing content from a recording device, such as video or AR content, cataloging content and delivering unique content such as video or AR to specific user devices at a venue during an event or remote user devices viewing a live event remote from the venue to users who have scanned a tag with their user device is shown in FIG. 1. The system (10) may include an administrator device (12), a platform (20), a user device (14a) associated with an event user (e.g., physically at the event/in the venue), a user device (14b) associated with a remote user (e.g., not necessarily at the event/in the venue), a plurality of tags (16a, 16b) and one or more networks (18). Generally, each user device (14a, 14b) may be used to scan, read, or otherwise detect (collectively "scan") machine-readable code ("MRC") (17a, 17b) associated with a respective tag (16a, 16b). The act of scanning a tag (16a, 16b)/MRC (17a, 17b) initiates communications between the user device (14a, 14b) that scanned the tag (16a, 16b) and the platform (20), which may result in the rendering of a Web page or the like (e.g., related to the event) by a Web browser and/or other application running on the user device (14a, 14b). Communications between user devices (14a, 14b) and platform (20) is typically via one or more networks (18), which may include, without limitation, the Internet, mobile networks, cloud-based platforms, or combinations thereof.

A proprietor may use a network of encoded tags (16a, 16b) to identify points of interest (e.g., locations, objects, people, etc.). The number of tags (16a, 16b) in the network and placement of tags on, in, or near points of interest is at the discretion of the proprietor to fit its particular assets and needs. Further, a proprietor may add to or subtract from the number of tags (16a, 16b) in the network at will. Thus, the number of tags (16a, 16b) in a proprietor's network may be dynamic, either more or less than an original network of tags. Each tag (16a, 16b) in the network of tags has a unique identifier (tag ID), which may be used to identify a particular point of interest. For example, a tag (16a, 16b) may be situated on or near a seat in a stadium, and the user who purchased a ticket to sit in that seat is the "limited owner" or renter of that seat for a particular event. In certain embodiments, it may be possible to have multiple copies of the same tag, each with the same tag ID, in locations where multiple scans would be desirable at the same time by multiple users. Thus, at the entrance to a stadium, a plurality of tags could be located at different entrance points, each having the same tag ID.

As is implied in FIG. 1, a certain number of tags (16*a*) may be present at the venue ("in-venue tag"), and additional one or more tags (16*b*) may be remote from the venue ("remote tag") where the MRC (17*b*) is displayed in/on a video transmission, signal, or the like, or on a Web page associated with the event, venue, and/or television network, as a few non-limiting examples. Of course, there is the possibility that a user at the event/in the venue scans the remote tag (16*b*) with his/her user device (14*a*). Each user device (14*a*, 14*b*) may also include, or may eventually include, a unique identifier (22*a*, 22*b*) to uniquely identify the user device (14*a*, 14*b*) and a digital wallet (24*a*, 24*b*) to securely store sensitive information such as a driver's licenses, account information (e.g., banks, crypto currencies, credit cards), titles, tokens, tickets, vouchers, coupons, and the like. Similarly, user devices may also store digital files (301*a*, 301*b*) that can be uploaded to a video file or can be utilized in conjunction with a video file.

The proprietor may also access platform (20), albeit via the administrator device (12) and one or more networks (18). The administrator device may be located at the venue, or it may be at a location remote from the venue. Generally, the proprietor may access a proprietor portal (FIG. 3 at [322]) hosted by platform (20) to perform administrative and/or other activities such as determining what content (or other) will be sent to the user device (14*a*, 14*b*) in response to scanning a tag (16*a*, 16*b*).

In addition to hosting the proprietor portal, platform (20) may host a variety of other services including, without limitation, event user and remote user access to content associated with the event, venue, proprietor, and the like. As such, platform (20) may include, or may include access to, one or more servers, databases, application programming interfaces (APIs), artificial intelligence/machine learning algorithms, other algorithms, code, blockchains, blockchain platforms, geofences, third-party integrations, times stamp, and more, which is detailed below, with reference to accompanying figures.

Figure 2:
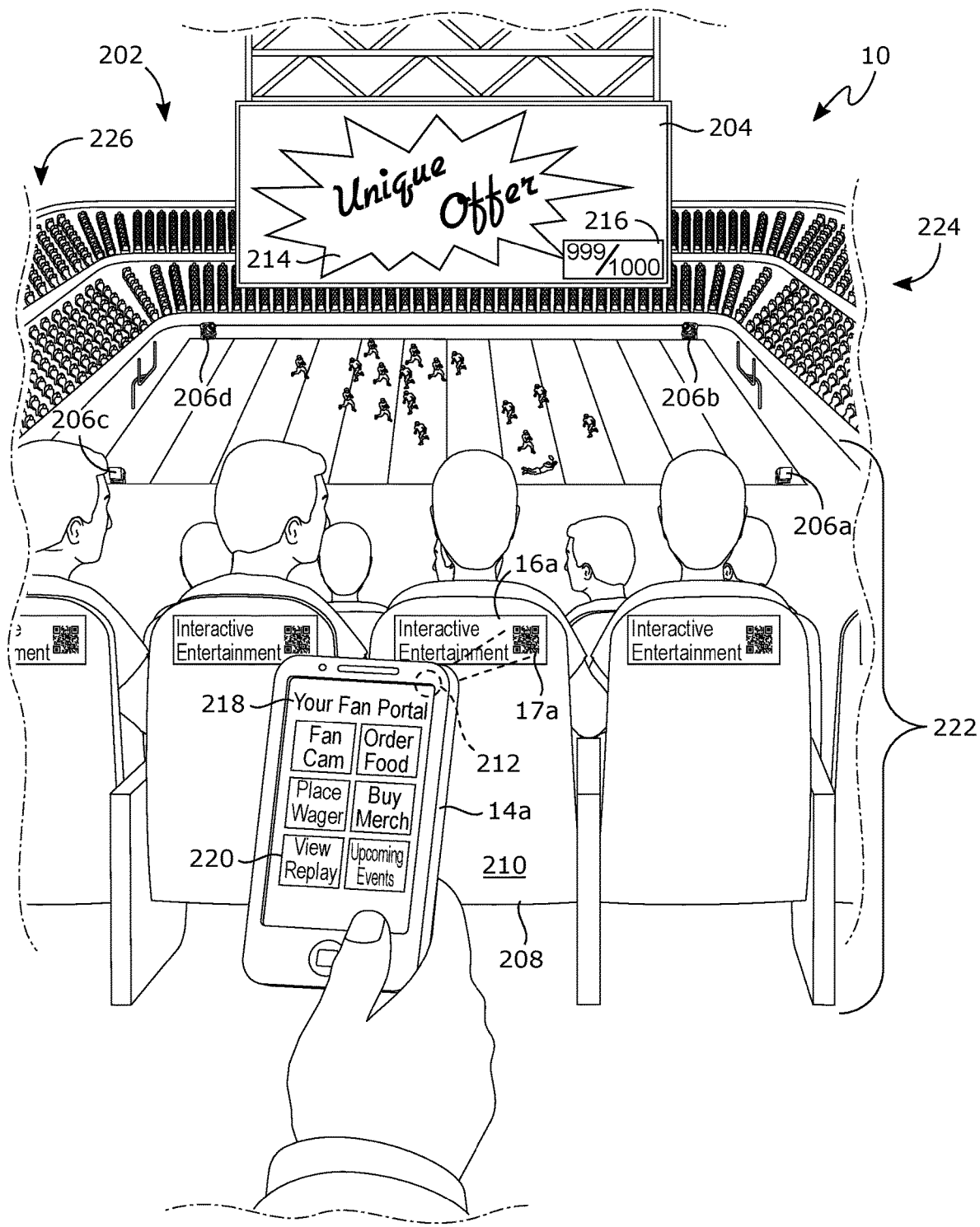
FIG. 2 depicts a stadium comprising a plurality of video cameras and a mobile device that is accessing a user portal including access to video or augmented video playback.

FIG. 2 shows an exemplary venue (202), which includes a portion of system (10) shown in FIG. 1. In this case, the venue (202) is a football stadium including a jumbo screen (204), recording devices (206*a*, 206*b*, 206*c*, 206*d*), seats (208), and a plurality of tags such as tag (16*a*). Although a stadium is shown, the venue (202) can be any venue: small, large, indoor, outdoor, permanent, temporary, one structure, several structures, an entire city, and variations thereof. Thus, a venue (202) can be any area or space occupied by or intended for something, and as such associated amenities and accoutrements may drastically vary from venue to venue. In this example, the stadium has jumbo screen (204), which may display a wide variety of video content as is customary for a football game, though such display screen is not necessary for functionality of the system, including a unique offer (214) and a counter (216), each of which may be utilized in certain embodiments. The stadium also includes optional recording devices (206*a*, 206*b*, 206*c*, 206*d*) such as video cameras for recording the football game and other activity, which is also customary for this type of venue (202). Likewise, an event may be any event including sporting events, artistic performances, trade shows, conferences, ceremonies, services, self-guided tours (e.g., at museums, historic sites), and zoos as a few non-limiting examples. Notably, museums, historic sites, zoos, and similar examples may be both the venue and the event or house the event and while the system can be utilized in the aforementioned venues, the system is most advantageous at events where live action occurs.

As detailed in the preferred embodiments herein, by use of augmented reality, we can modify the way in which the video is captured and consumed. For example, by use of a plurality of recording devices (206*a*, 206*b*, 206*c*, 206*d*), a live event, such as a football play, or the practice swings of a baseball player can be captured by all the recording devices (206*a*, 206*b*, 206*c*, 206*d*) for a single live event, i.e., in this case a single play or swing. The plurality of recording devices (206*a*, 206*b*, 206*c*, 206*d*) is positioned to capture the play or swing in different visual planes, for example, a series of four recording devices (i.e., video cameras, etc.), each positioned at a relative "corner" of a hypothetical quadrilateral shape surrounding the player. The recordings such as video from the four recording devices thus captures the live media from a left rear (206*d*), a right rear (206*b*), a right front (206*a*) and a left front (206*c*). The four visual positions and their associated video are combed into a single augmented video file. This augmented video file allows for rotation of the video, because the four recording devices, generating four video files, once stitched together, allow for orientation of the video image based on the desired perspective. Thus, the video can be slowed down, rotated, stopped, rewound, provided with overlays of additional material and information, etc., and oriented as desired by the user.

The total number of recording devices may be more or less than four, however, to typically achieve proper augmented video playback at least four recording devices are preferred. The recording devices (206*d*, 206*c*, 206*b*, and 206*a*) are oriented at different points so as to capture the recording, (i.e., video image) from a different orientation. Notably, as these are placed in four corners surrounding the live action being performed and captured by the recording devices (206*d*, 206*c*, 206*b*, and 206*a*), though the embodiments are not so limited to the position in the four corners. Because the nature of the live action is being captured between the four recording devices (i.e., video cameras), each captures the same live action from a different perspective. This allows for combining a data video file from each of the four recording devices (corresponding to the same precise time of the live action) to create an augmented video file that can be manipulated.

In the example of FIG. 2, each seat (208) has a seatback (210) with a tag (e.g., 16*a*) disposed thereon. In this way, event users can easily see a tag (e.g., 16*a*) directly in front of them while they are sitting in their seats (208). Thus, the tag (e.g., 16*a*) that the event user sees is associated with the seat (208) in which the user is sitting. Tag association with a particular seat (208) is desirable in embodiments that take advantage of knowing the event user's seat location such as for food or merchandise delivery directly to the seat (208), or benefits related to a given seat, as non-limiting examples. In-venue tags (e.g., 16*a*), however, are not limited to being positioned on seatbacks (210); they may be placed in a wide variety of locations within a venue (202). For example, if in-venue tags (16*a*) are associated with particular seats (208), they may be placed in any other location on or near the associated seat (208) such as an arm rest, a cup holder, on the seat (208) next to the event user's leg, on the ground, or on a structure near the seat (208) such as a wall, a pillar, or the like. It should be noted that in-venue tags (16*a*) may be associated with other locations/points of interest, and thus may be placed at or near the locations/points of interest such as entrances, levels, sections, isles, loge seats, individual people (e.g., with a tagged badge, tagged ticket, or the like), restrooms, various additional possibilities, or combinations thereof. Therefore, while one example of in-venue tag (16*a*) placement is illustrated in FIG. 2, in-venue tag (16*a*) placement should be broadly construed to include any placement suitable for use as described herein. Tags (16*a*) may be associated within groupings, for example, by a section (222, 224, or 226), wherein grouping of tags (16*a*) may provide certain benefits in the various embodiments detailed herein. Alternative placement schemes that may be devised by one skilled in the art, consistent with the teachings of the present invention, should be considered within the scope of the present disclosure.

As was mentioned with respect to FIG. 1, each tag (16*a*, 16*b*) in the system (10) has a machine-readable code (17*a*, 17*b*) associated therewith. The term machine-readable code ("MRC") as used herein should be broadly construed to include "graphics" type codes such as quick response (QR) codes, universal product code (UPC), snapcodes, and/or any other type of machine-readable graphics (e.g., having a pattern, matrix, or the like) coding known in the art or later developed. Importantly, as used herein, the term machine-readable code/MRC should also be construed to include "chip" technologies that store data on a chip such as, without limitation, near-field communication (NFC) and radio-frequency identification (RFID) technologies, as is known in the art or is later developed. Thus, MRC can be read, scanned, detected or otherwise decoded (collectively, "scanned") by an appropriately enabled (e.g., camera, QR scanner, and/or NFC reader [212]) user device (14*a*, 14*b*).

In-venue tags (16*a*) may be physical (e.g., tangible), digital (e.g., virtual/intangible), or combinations of both forms. Physical tags may be constructed from diverse types of materials. In the case of tags having one or more graphical/matrix type codes such as QR codes, barcodes, and the like, the code may be printed, etched, fabricated, or the like on materials such as paper, glass, plastic, metal, fabric, and the like, as a few nonlimiting examples. In the case of NFC/RFID enabled tags, chips/antennae may be adhered to, attached to, embedded in, or fabricated on (or combinations thereof) a natural or manufactured material such as metal (e.g., aluminum, stainless steel), semiconductor, wood, polymer (e.g., plastic), film, glass, and combinations thereof, without limitation. The material may be incorporated into or affixed (e.g., adhesive, or other form of attachment) where desired. Digital tags may be displayed on a screen or communicated via radio waves. In the case of QR codes, barcodes, and the like, the graphical code may be displayed on a display screen such as the jumbo screen (204) or a display screen associated with the event user's seat (208), other locations/point of interest, or combinations thereof. Thus, the in-venue tag (16*a*) may be a video display, such as LCD, LED, e-ink, or other visual display and/or text accompanying the MRC (17*a*). In fact, most, if not all, remote tags (16*b*) will be a display screen such as on a television screen, computer screen, appliance screen, and the like, having the MRC (e.g., 17*b*) displayed thereon, or text on the display screen identifying the MRC (17*b*), although embodiments are not limited thereto.

Information encoded on or in each tag in the system (10) may include an address to direct a request (e.g., for a Web page) from the user device (14*a*, 14*b*) to a server or the like on the network (18) such as a server on platform (20). The address may be in the form of a uniform resource identifier (URI) such as a uniform resource locator (URL), according to a non-limiting embodiment. In this way, when the user scans the tag (16*a*, 16*b*) with the user device (14*a*, 14*b*), the user device (14*a*, 14*b*) sends a request to the appropriate network (18) location. In the example shown in FIG. 3, when the event user uses his/her user device (14*a*) to scan tag (16*a*), the event user device (14*a*) obtains an address from the MRC (17*a*) associated with the scanned tag (16*a*) and sends a request via the network (18) to the address destination. As one example, the address is a URL that causes the event user device (14*a*) to send a request to a redirect/identification server (302), on platform (20), which receives the request. Similarly, when the remote user uses his/her user device (14*b*) to scan the MRC (17*b*) on a screen (304), a similar URL is obtained which causes the request from the remote user device (14*b*) to be sent to the redirect/identification server (302), which receives the request.

In a typical embodiment, each tag (16*a*, 16*b*) in the plurality has a unique tag identification number (i.e., "tag ID"), which may be appended to the URI/URL, although embodiments are not so limited. The tag ID may be used by the platform (20) for several reasons, one of which is to identify a point of interest/location associated with the tag (14*a*, 14*b*) via a tag ID lookup. For example, when a request comes from the event user device (14*a*), the platform (20) knows that the request came from within the venue (202) and is associated with the seat (208) in which the event user is sitting. And when the request comes from the remote user device (14*b*), the platform (20) knows that the request is in response to scanning a tag (e.g., 16*b*/MRC 17*b*) in transmission, on a Web page, or the like, and the platform (20) knows which transmission/Web page is associated with the scanned tag (16*b*). In an embodiment, the tag ID may be appended to the URL (or URI) such as by one or more parameters, pattern matching techniques, or other such mechanism for encoding information in a URI, URL and/or browser request.

Figure 3:
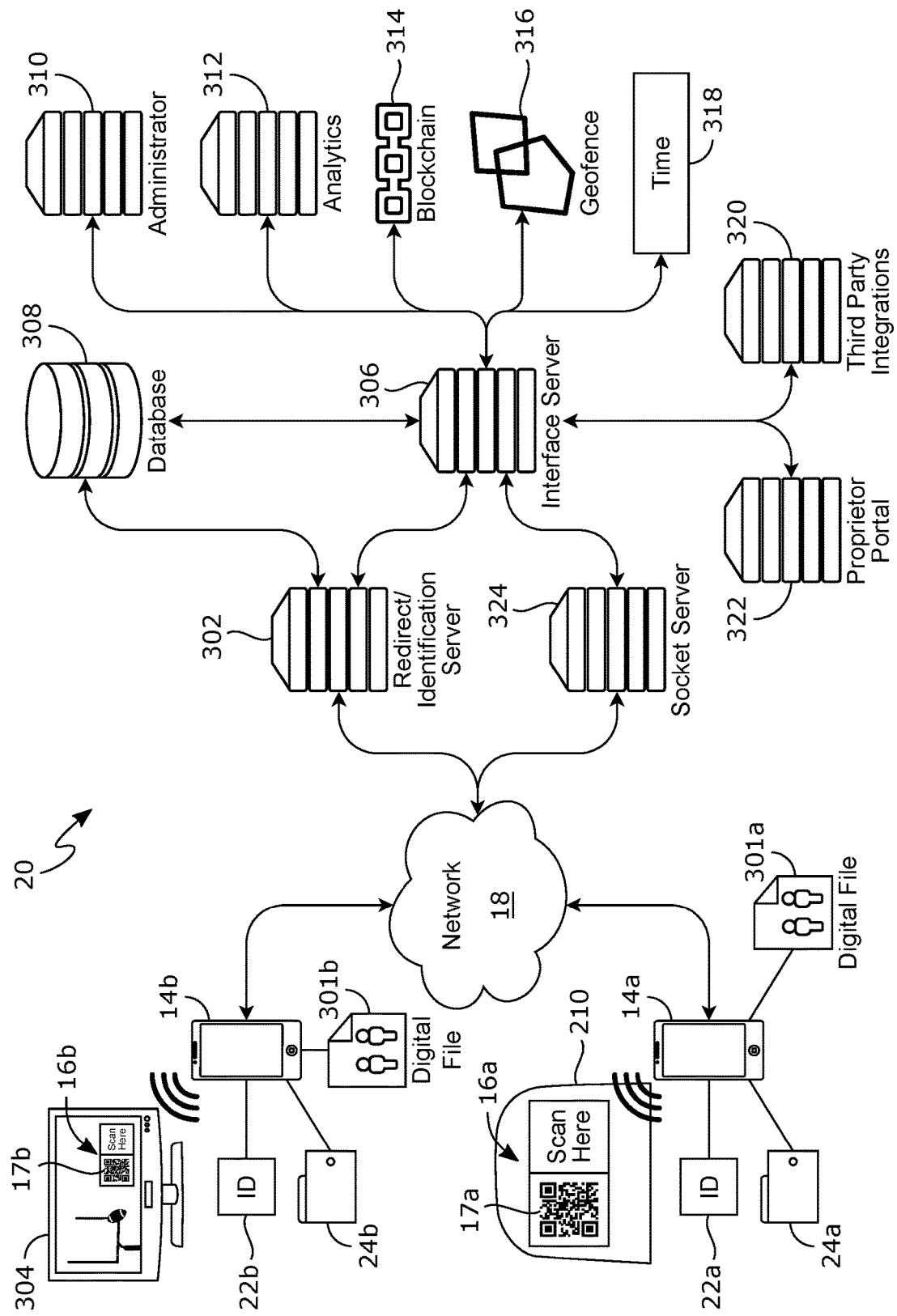
FIG. 3 depicts an embodiment of a system for accessing target information from a user device from within a venue or outside of a venue and various back-end platforms for implementing certain target information or for delivering content to the user device.

FIG. 3 details an exemplary infrastructure that may be used by platform (20) although infrastructures are not limited thereto. This infrastructure may include the redirect/identification server (302), an interface server (306), a database (308), an administration server (310), an analytics server (312), a blockchain, access to a blockchain, or both (314), a geofence (316) a timestamp (318), one or more third-party integrations (320), the proprietor portal (322), and a socket server (324). Generally, user device (14*a*, 14*b*) may comprise an id (22*a*, 22*b*), a digital wallet (24*a*, 24*b*), and a digital file (301*a*, 301*b*) communicates with the platform (20) via redirect/identification server (302) as was previously described. Redirect/identification server (302), accept requests from user devices (14*a*, 14*b*), sends responses to user devices (14*a*, 14*b*), and performs various other methods as described herein. As one non-limiting example, the redirect/identification server (302) may forward information (e.g., URLs, parameters, etc.,) from user device (14*a*, 14*b*) requests to the interface server (306). The interface server (306) handles most, if not all the tasks involved with processing requests, such as handing off/directing tasks, functions, calls, and the like where needed. The interface server (306) may also return request responses to the redirect/identification server (302). If a request came from a user device (14*a* or 14*b*), then the redirect/identification server (302) forwards the response to the requesting user device (14*a* or 14*b*). Examples of tasks, functions, calls, and the like that the interface server (306) may hand off include, without limitation, database (308)/blockchain storage, lookups, etc., administrative and back-end tasks/functions to the administration server (310), analytical tasks/functions to the analytics server (312), geolocation tasks/functions (316), time/timestamps (318), API calls to third-party servers for third-party integrations (320) and establishing socket connections via socket server (324).

Figure 4:
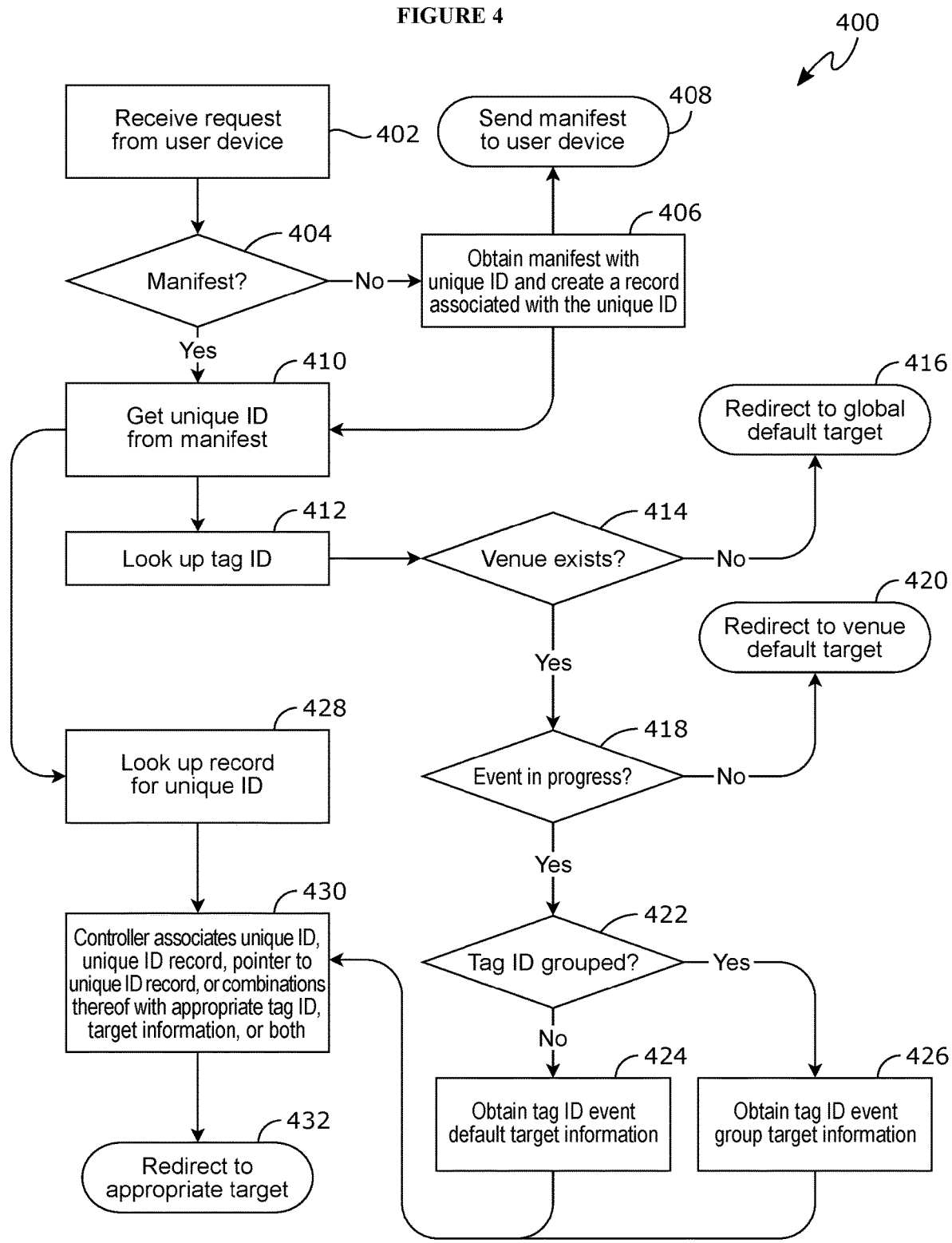
FIG. 4 depicts an embodiment of a system for identifying and using information particular to a user device and/or to a tag for directing the user device to an appropriate target.

Referring to FIGS. 3 and 4 together and using the request from event user device (16*a*) as an example, a method (400) may begin with the redirect/identification server (302) receiving the request (step 402) from the event user device (14*a*). From there, the redirect/identification server (302) may check to see if the event user device (14*a*) has a manifest (containing the unique ID, or just the unique ID alone) loaded thereon (step 404). If no, the redirect/identification server (302) may obtain a manifest and assign a unique ID (e.g., from database [308]) for the event user device (14*a*, step 406). The manifest includes a unique ID to identify the event user device (14*a*) with an identifier that is not shared with any other user device (e.g., 14*b*). The redirect/identification server (302) will also cause the unique ID for the event user device (14*a*) to be stored in a database such, as database (308), as is appropriate for the database management system (step 406). For example, a record for a unique ID may include the unique ID and any other data or information related thereto, which may be stored in database (308) or other appropriate data storage. As used herein, the term "record" refers to information that is stored in an electronic or other intangible medium without limitations on how the data is structured. A record may include and/or point to related data. After obtaining the manifest and/or the unique ID, the redirect/identification server (302) may then send the manifest together with the unique ID to the event user device (14*a*, step 408), which may be maintained on the event user device (14*a*) in a digital wallet, other secure repository, or both. At step (410), the redirect/identification server (302) may maintain a copy of the unique ID for further use in the method (400), other methods described herein, or both. If the event user device (14*a*) already has a manifest (step 404, yes), the redirect/identification server (302) obtains the unique ID from the manifest (step 410). In an embodiment, the redirect/identification server (302) may also obtain data such as current time, date, location, etc. from the event user device (14*a*), manifest, request, or combinations thereof at step (410).

In an embodiment, the redirect/identification server (302) may pass information needed to further method (400). For example, the tag ID may be passed to the interface server (306) for a tag ID lookup (step 412), such as in database (308), the administration server (310) and/or any other suitable database or server. In this instance, the redirect/identification server (302) obtained the tag ID from the request made by the event user device (14*a*). In an embodiment, the tag ID is appended to the URL, and thus the entire URL, or a portion thereof, may be passed to the interface server (306) for use in looking up the tag ID. Looking up the tag ID provides information about the venue (202) and/or event. To clarify, when a particular venue (202) installs tags (16*a*) and/or uses tags (16*b*), the tag IDs for the installed/used tags (16*a*, 16*b*) are associated with the point/location of interest and the particular venue (202). Thus, if a tag is installed proximate seat 1, row A, section 100, database (308) information associates the installed tag's (16*a*) tag ID and that particular seat (208), which is in that particular venue (202). Since the tag ID is known to belong to a particular venue (202), the interface server (306), the administration sever (310) via the interface server (306), any other suitable server, or combinations thereof makes a series of determinations using the tag ID, which was received in response a request from a user device (14*a*, 14*b*) prompted by scanning the tag (16*a*, 16*b*). One determination is if the venue (202) is actively implementing platform (20) services (step 414). For example, the venue (202) may have tags (16*a*) installed but it is no longer using the tags (16*a*), or it is not using the tags for a particular event. If not, the event user device (14*a*) is redirected to a global default target (step 416) that may inform the event user that the services are no longer available, are temporarily out of service, to a generic homepage, or the like. If the venue (202) is actively implementing platform (20) services, the method (400) may make another determination. At step (418), the method (400) may determine if a particular event is currently (or soon to be) in progress, or recently ended. In an embodiment, an event may be determined to be in progress based on the time that the event is scheduled to begin. Since many venues (202) open before the actual event begins, and close after the actual event ends, the window set for an event to be in progress may encompass a given amount of time before and after the actual activity begins/ends. In an embodiment, the time that the "event in progress" determination is made (step 418) may be recorded to serve as a timestamp to approximate the time that the event user device (14*a*) scanned the tag (16*a*). In other words, the unique ID, tag ID, and time determination may be recorded for later use, in certain embodiments. If the event is not in progress, the event user device (14*a*) may be redirected to a venue default target (step 420) such as a Web page for the venue, or another Web page such as a page to identify that an incident has occurred at the venue (202) at the location/point of interest in which the tag (16*a*) was scanned. Incidents may encompass any sort of incident such as a need for something to be cleaned up to calling emergency services.

If the event is in progress, the method (400) may also determine if the tag ID belongs to a grouping of tag IDs (step 422). Tags (16*a*, 16*b*) may be grouped for many reasons and in many different ways. Tags (16*a*, 16*b*) may also belong to more than one group. As one non-limiting example, in the stadium of FIG. 2, the tags (16*a*) may be grouped by seating type or section (e.g., FIG. 2, 222, 224, or 226), e.g., VIP seats may belong to one group, loge seats to another group, and discount/student seats may belong to yet another group. If data associated with the tag ID indicates that the tag belongs to a group, the event user device (14*a*) may be redirected to a target for the particular group. For instance, the target for users sitting in VIP or loge seats may be a Web page associated with event that includes premium content, offers, and the like, whereas the target for users sitting in discount/student seats may be a Web page having content and features that typically appeal to students, recent graduates, or the like. Thus, the method (400) obtains the information it needs to enable redirection to the appropriate group target (step 426). If data associated with the tag ID indicates that the tag does not belong to a specific group, the event user device (14*a*) may be redirected to an event default target such as a standard Web page for the event. Thus, the method (400) obtains the information it needs to enable the redirection (step 424) to the default target for the event. In an embodiment, the information needed for redirection may include a URL for the target with parameters, values, patterns, or the like appended thereto such as a target ID to identify the target and the tag ID.

Method (400) may simultaneously process other data such as looking up one or more records associated with the unique ID (step 428). In embodiments, the platform (20) may gather information relating to user activities via the user device and unique ID. For example, the platform (20) may gather data relating to tags that the user has scanned in the past (across a variety of different events, venues, or the like) and activities associated with those tag scans (e.g., purchases made, content looked at, coupons downloaded), although embodiments are not limited thereto. This data may be stored in association with the unique ID assigned to the event user device (14a). Thereafter, a controller may associate the unique ID, its record, its record location or the like with the tag ID, target ID, a URL, any other determined information, or combinations thereof (step 430). The event user device (14a) may then be redirected to the appropriate target that has been determined for the event user device (14a).

When a request comes from a remote user device (14b), the method (400) starts out essentially the same as with the event user device (14a). That is, the redirect/identification server (302) receives the request (step 402), checks for a manifest, containing a unique ID (step 404), assigns a manifest with a unique ID if one has not yet been assigned (step 406), and sends it to the remote user device (14b, step 408) for secure storage thereon. If the remote user device (14b) has a manifest, then the redirect/identification server (302) obtains it (and other information such as a unique ID) from the remote user device (14b). Either way, the redirect/identification server (302) has the information that it needs such as unique ID, URL, tag ID, and the like, and forwards the information to the interface server (306) to continue the method (400). The interface server (306) may then look up, or cause to look up, the record associated with the unique ID (step 428) assigned to the remote user device (14b). At the same time, the interface server (306) may cause a determination to be as to whether the venue exists (step 414). In this case the interface server (306), or other server, may look at the data associated with the tag ID to determine from where the tag (16b) that was scanned originated. For example, the MRC (17b) may have originated from a particular signal, transmission, etc., (e.g., network, regional network, etc.), Web site (e.g., for the venue, a streaming service, etc.) or the like. If, the method (400) determines that the venue does not exist, for example, if the tag is to an unrelated element, then the remote user device (14b) is redirected to that unrelated element or to a global default target (step 416), for example if the tag is related. Assuming that the venue in this case does exist, the interface server (306)/method (400), then determines whether the event is in progress (step 418). If the signal, transmission, Web page, or the like is transmitting an event as it is occurring in real time then the event is in progress. Such can also be determined by a time stamp or time record set within the system. Either way, in an embodiment, the time the determination is made may be recorded by the platform (20). If the event is not occurring in real time (e.g., the user is watching a recording after the fact), then the remote user device (14b) will be redirected to an appropriate target such as a Web page relating to the event (step 420). However, the proprietor can set any time parameter to define "real time". For example, a proprietor may desire to allow recordings watched within N number of days of a live event to constitute real time. The interface server (306) may then determine if the tag (16b), via the tag ID belongs to a group (step 422). For instance, different tags (16b) may be associated with different signals, transmissions, Web sites, or the like. Some of these tags (16b) may form groups based on predetermined criteria. Thus, if the tag (16b) belongs to a group, the remote user device (14a) will be redirected to the target for the appropriate group, and if not, the remote user device (14a) will be redirected to the default target. The default target for remote users may or may not be the same default for event users. Either way, the information relating to the determined redirection target is obtained (step 424, 426). At step (430), a controller may associate the unique ID, the record for the unique ID, a pointer to the record for the unique ID, the tag ID, and target information such as a URL, target ID, or both. Thereafter, the remote user device (14b) is redirected to the appropriate target (step 432), as was described with respect to the event user. In certain embodiments, the step of (428) may be provided in parallel to or concurrent with the lookup of the tag ID (step 412), where the unique ID is necessary for determining any of the other elements. Furthermore, the unique ID may be stored, for example in local memory or cache, which is readily accessible or known to the system after step (410).

In an embodiment, the user device (14a, 14b) may receive a redirect URL from the redirect/identification server (302) at the end of method (400) to redirect the user device (14a, 14b) to the appropriate target. For instance, the method (400) may return a target ID to identify the particular target. The target ID, tag ID, unique ID (and/or information associated therewith), or combinations thereof may be appended to the redirect URL for the target, which is sent to the requesting user device (14a, 14b). The requesting user device (14a, 14b) then uses the redirect URL to send a new request, this time for the target, which is received by the redirect/identification server (302) and is forwarded to the interface server (306) for processing. Alternatively, the target ID, tag ID, and unique ID may be used by the platform (20) without sending a redirect URL to the requesting device at the end of method (400). Regardless of the forgoing, the requesting user device (14a and/or 14b) receives the target of the redirection whatever that target may be.

Furthermore, targets are not necessarily static. In fact, the same tag (16a) may cause a user device (e.g., 14a) to be redirected to distinct targets depending upon when the tag (16a) is scanned. A proprietor or administrator may also change a target during the course of a particular event. One of ordinary skill in the art would understand a target of redirection as described herein may be a multitude of different targets with various purposes, designs, capabilities, and the like. Therefore, the target to which a particular tag (16a, 16b) is assigned, may be changed by simply changing the target ID associated therewith.

There may be instances where the content delivered via the target may need to be changed, updated, altered, released, opened, or other such stipulations. Rules may be defined to force a modification of content already delivered, deliver additional content, information, data, release content, and/or make other such changes as would be appreciated by one skilled in the art. for example, to FIG. 4, at (432). In this non-limiting example, the target delivered at (432) FIG. 4 includes a Web application, such as a progressive Web application (PWA), that has a pull function. The pull function, as one non-limiting example, may be timed based requesting (e.g., pulling) information from the interface server (306) every 10 seconds, N seconds, N minutes or the like, as desirable for the particular time-based function. As another non-limiting example, the target may be a Web page that includes the ability to have data updated on a rolling basis. In the sporting world, this is common when updates are provided to the score of a game, the time left in a game, or both as non-limiting examples. However, another option that can occur independently of, or can occur in concert with pulling data from the platform, is a push of data from the platform (20) to the Web application, Web page, or other such target on the user device (14a and/or 14b). Thus, the interface server (306) may receive information to be pushed to the Web application or the Web page. Web application or the like based on a template, can receive updates etc. to the data, information, content, or combinations thereof contained in template elements via push techniques, pull techniques, or both. Pushed and/or pulled content, data, information, and the like may occur via a socket connect utilizing a socket server (324) or any other socket connection, communication connection, protocol, and the like, or combinations thereof as is available to the platform (20) under a set of given circumstances.

While the target of redirection (e.g., fan portal [218] or targets [862-865] from FIG. 8) is loading on the requesting user device (e.g., 14a and/or 14b), after the target is already loaded on the requesting user device (14a and/or 14b), or both, the platform (20) may invoke the method detailed in FIG. 5. As with all methods detailed herein, steps in the method (500) may be used in whole or in part, in the order shown or a different order, be executed on one device or more than one device, be used in combination with some/all of the other methods described herein or as is known in the art, or combinations thereof.

The communication connection (504), which may be a socket connection or any other appropriate type of connection, may be used to allow communications between the user device (14a and/or 14b) and the platform (20) including pushing and pulling as described above. A controller (506) may be a set of software code that is utilized to manage, direct, or generally be in charge of one or more rules, enabling pushing and/or pulling per the rules. In this example, rules may be used to change content on the user device (14a and/or 14b). That is, rules may impact the particular target being displayed on the user device (14a and/or 14b). The rules can come in several different forms, and per this non-limiting example may be event rules or local rules. Generally, an event rule is monitored by the platform (20) and may cause data to be pushed and a local rule comes from a user device (14a, 14b), which wants data (i.e., pulls data) from the platform (20). A rule for a sporting event may relate to points scored, or another occurrence in the game. As an illustration, the rule may be if team "A" scores a touchdown, push an AR video to all user devices (14a, 14b) that have scanned tags (16a, 16b). Here, the metric or trigger of the rule can be monitored (step 516) such as by directly sending a request or query to a data source (at 512) via the interface server (at 510), receiving data from the data source (at 512) on a regular basis such as every 5 seconds, 5 minutes or the like (via the interface sever [at 510]), or combinations of both. Another type of event rule may include more than one trigger/metric. For example, the rule may be that if team "A" scores a touchdown, push an AR video playback of the touchdown with advertising for an alcohol brand to all event users over the age of 21 that have used their user device (14a) to scan a tag (16a) in the venue (202). The first metric/trigger of whether a touchdown has been scored may be monitored as described above. The second metric/trigger may be monitored in the same or similar manner. For example, since the metric/trigger relates to age, a query may be sent to the database (at 512), via the interface server (at 510), to find all users who are over the age of 21. In this query, user records associated with unique IDs may be searched for age, tag ID, time, and/or other search parameters to determine users who have scanned a tag (16a) during the event, and who are at least 21 years of age. As a backup, alternative, confirmation, or if database data does not have the answers, another data source (at 514) may be consulted to determine if the age metric/trigger has been met. For example, one or more third-party integrations may have age information; thus, an API call or other query may be made to obtain ages. With either of the forgoing rule examples, if the first metric/trigger (step 520, no) is not met (i.e., touchdown), then the platform (20) continues to monitor the metric/trigger (step 522). If the metric/trigger (step 520, yes) is met, and there is no second metric/trigger (518) then the content (e.g., AR video) is pushed (step 526) to the user devices (14a and/or 14b), such as, via the controller (at 514, 506, via the connection 504). If there is a second metric/trigger (518), then upon receiving a yes at (520), a determination is made to see if the second trigger/metric has been met (step 524). If the second trigger/metric has not been met then the target on the user device (14a) is not updated (step 528), such as with the digital offer. Depending upon the rule the second metric/trigger may continue to be monitored or not. For example, if the digital offer was to be sent only one time, then the rule is satisfied, and no additional monitoring will continue. If, however, the rule sent the same AR video every time team "A" scored a touchdown, the second metric/trigger would not have to be redetermined since even if the user turned 21 that day, the user's age would not change. Of course, if the event went past midnight, the rule could be structured to recheck ages after midnight. This does not mean that for a given rule a second (or third, or fourth, etc.,) trigger/metric would never need to be monitored. Should an additional metric/trigger be defined by a rule that needs additional monitoring, the method (500) will be allowed to do so. If at the determination made at step (524) is yes, the content may be pushed (526), such as via the controller (at step [514] or [506]). Pushed content may update an element on a Web page, cause a popup to show on the user device (14a, 14b), send a content to a digital wallet (24a, 24b), or any other way to push content as is known in the art.

Further examples of rules may also be understood by those of ordinary skill in the art. For example, the interface server (306) may determine, or cause to be determined, if there are any rules associated with the selected template or other target. Generally, a rule may define criteria that must be met for an occurrence to happen. In an embodiment, the data associated with the unique ID may be pre-analyzed to see if the local rule has been satisfied. Alternatively, data associated with the unique ID may be gathered (e.g., database, from a third-party integration such as a ticketing service or the like) and analyzed when the event user device (14a) makes the request. As yet another option, the data may be pre-analyzed and verified/checked for changes upon the event user device (14a) requests. The interface sever (306) may take all of the variables from the target application code, template, rules, and the like and send requests/queries to the appropriate data sources or links to the data sources (at 512). The data sources may include data from the database (308), blockchain (314), geofence (316), timestamp (318), third-party integrations (320) such as data servers/databases, analytics server (312), and administration server (310), and a counter (at 512), without limitation. A counter may be software on platform (20) that may be used as a counting mechanism for rules or other reasons. As such, the counting mechanism may be configured to meet the counting requirements of a rule or other counting need. As an illustration, a counter may count the number of tags (16a) scanned in a venue (202) during a particular event; count the number of tags (16a, 16b) scanned by a particular user device (14a, 14b) in a predetermined time window; count the tags (16a) scanned by a particular user during a particular event; count the number of times a user has interacted with the target delivered to that user device; or other such non-limiting illustrations.

The platform (20) may also collect a large amount of data from multiple sources regarding users and/or their devices (14a, 14b). Collected data via user device (14a, 14b) may be used to determine and/or customize content. In addition to information obtained after scanning a tag (16a, 16b) such as date, time, and GPS or other location, the platform (20) may also obtain device (14a, 14b) information such as device orientation (i.e., landscape, portrait), type (e.g., iPhone, Android), operating system, which is shown in FIG. 5 at (508). This, and other, information may be stored in database (308) or other data storage in association with the unique ID by way of interface server (510).

The analytics server (312), in an embodiment, may be a server or other device allowing communication, capture, decision making, etc., in order to receive and analyze various input from user device (14a, 14b) (e.g., at [508] via the interface server at [510]). The analytics server (312) may also allow communication, capture, decision making, etc., to receive and analyzed various data from third-party integrations (320), time/timestamp (318), geofence (316), blockchain (314), database (308), and even proprietor portal (322), as a few non-limiting examples either alone or together with input, data, information, etc., from user devices (14a, 14b). As has been mentioned, the unique ID may enable collecting/storing significant data about the user/user device (14a, 14b) from multiple sources. As one non-limiting example, the unique ID may allow the platform (20) to collect information about the user via the user device (14a, 14b) from service providers, such as mobile/cellular service providers, that are used in association with the user device (14a, 14b). As another non-limiting example, information associated with the user device (14a, 14b)/unique ID may be collected from various third-party integrations such as in-venue/event metrics, third-party metrics, ticket brokerage, and other tools, without limitation to the forgoing. In-venue metrics may include data collected relating to the venue, event, or both. For example, information relating to user purchases such as tickets, food, merchandise, videos watched, and upgrades and the like may all be gathered and stored in association with the unique ID. Third-party metrics integrations (320) may enable collecting information about the user/user device (14a, 14b) from third parties who participate in a shared program or who sell or otherwise provide marketing information, demographics, and other data about the user. Similarly, ticket brokerage integrations (e.g., 320) may be used to gather from ticket brokers who sell tickets for the venue (202), event, or both, and may include a wide range of marketing data, not only about ticket purchases made, but also related information about the user. User/user device (14a, 14b) data may also be obtained via tools such as cookies, widgets, plug-ins, and similar tools. Finally, certain metrics may be provided directly by the user, for example, information can be provided in order to access certain opportunities or offers, which may include personally identifiable information, unique information such as interests or responses to questions, as well as generic information such as age or sex. The forgoing mechanisms may be used to get information about the user/user device (14a, 14b), especially when the user is actively engaged with the platform (20). Information/data relating to the user/user device (14a, 14b) via the unique ID or otherwise, may be stored in database (308) or another such database or data store (e.g., blockchain [314]) and analyzed via analytics server (312), which in an embodiment may include artificial intelligence analysis such as machine learning/pattern recognition/deep learning as is now known or will be known in the art.

User/user device (14a, 14b) information, data, etc., may also be obtained as the user engages with a target (e.g., fan portal [218] at [508]), other Web sites, the Internet, and the like. This information/data may be collected and analyzed within the analytics server (312) and coupled with other information relating to the user/user device (14a, 14b), including the unique ID associated with the user device (14a, 14b). For example, the platform (20) and methods (e.g., 400, 500) may be configured to collect and aggregate analytical data relating to, without limitation, total screen time, Internet browsing (times, sites/pages accessed, software used), updates to Web pages, digital offers presented, digital offers downloaded, products viewed, purchases made, IP addresses, personal information input by the user, and the like whether or not the activities are through the target displayed on the user device (14a, 14b). Such data is of high value to, for example, advertisers, proprietors (e.g., team, venue, and/or event owners) as it provides a large insight into consumer purchasing and Web browsing habits.

Thus, when the interface server (306) sends (or causes to be sent) requests/queries to data sources (at 512) the unique ID, tag ID/target information, or combinations thereof may be used or provided to the third-party integrations (320) when such requests/queries are made. In this way, content provided to a particular user may be customized or modified as was described above with respect to FIGS. 4 and/or 5. Furthermore, the platform (20) may use data/information gathered as the user is engaged with the event to update/modify content in real time, upon a subsequent scan of tag (16a, 16b) by the user device (14a, 14b), or both (e.g., at 508).

If data is showing that a user has particular preferences, the platform (20) can modify content, such as advertisements that are delivered to that user or the team of videos provided for augmented video, as nonlimiting examples. Additionally, since the platform (20) may ascertain the features of the fan portal (218) or other aspects of the platform (20) that a user or multiple users interact with the most or spend the most time viewing, the proprietor may charge a premium to advertisers wishing to purchase the ability to place content, such as advertisement or digital offers on the pages or features of the fan portal that receive the most traffic. The unique ID of the system (10) with known information associated therewith can be used to access and utilize third-party advertising services to deliver unique advertising to the user. For example, where available, the platform (20) has the ability to interface with advertising platforms to deliver a customized experience based on the user's search history or user information as a whole.

Furthermore, in embodiments, the proprietor may be able to generate rules specific to a user, or send the user custom e-mails, push/socket notifications or other messaging based upon the user's interaction with the platform (20) or otherwise (e.g., at 514, 508). In an embodiment, a socket connection (e.g., at 504) between the user device (14a, 14b) and the platform (20) may be used for communications including pushing content, notifications, and the like, and dynamically updating content while the event is in progress, for example through push and pull features. Indeed, this provides for multiple opportunities for interaction and communication between the proprietor and the user to continue building relationships that can then be mined for longer-term relationships.

While a target is displayed on a particular device (14*a*, 14*b*), dynamic content may be seamlessly and dynamically updated/changed per coding/interactions between the user device (14*a*, 14*b*) and the platform (20). Certain dynamic changes are occurring through push and pull, as detailed by FIG. 5. However, dynamic updates/changes may further take place through the use of various third-party application programming interfaces (APIs) and their respective functionality. At a high level, the interface server (306) may connect, or may cause the third-party integration server (320) to connect, to third-party hardware/software (e.g., server) via one or more third-party APIs/API calls to access the respective third-party integration/functionality as is known or will be known in the art. Thus, third-party integrations/functionality may push or pull information through analytics server (312), retrieved from database (308) or another data store, or combinations thereof, for real time/live streaming, updating, changing, and the like as is called for by rules/instructions associated with the target of the tag ID. Furthermore, embodiments allow for the use of interactive, two-way communications between user devices (14*a*, 14*b*) and the platform (20) such as via the socket server (324) and/or a socket API, or the like as is known in the art. Certain communications then end, upon the end of the event or where the user closes the application, where the communication (at 504) is severed.

The forgoing has been described largely with reference to a sports environment where event users can scan tags (16*a*) located proximate each seat (208)/other point of interest or remote users can scan MRCs (17*b*) that appear on a screen such as a television or computer display. Other environments may utilize the same sort of tag (16*a*) placement strategy. However, sports environments provide a key opportunity to utilize various video files to provide fan engagement opportunities through augmented reality and video playbacks in augmented reality, such video files may be the target video.

Access to the target, such as an AR video file, can be performed in a number of ways. Certainly, access can be provided by a dedicated video system that is controlled by the user. This would enable direct visualization and modification of the stitched video files. A simple system would include the plurality of recording devices; a series of recordings, such as video, feeds into a computer. Software running on the computer can modify and stitch together the video file to create the augmented video file, and then a graphical user interface "GUI" can allow for manipulation of the augmented video file. However, it is not always practical to have an individualized video system for private use.

However, many public performances, such as sporting events in professional and collegiate level play include a plurality of video feeds. Those of ordinary skill in the art recognize that there are commonly multiple video feeds of live action play in any broadcast of the live event. Access to these video feeds, and specifically to an augmented, or augmented reality video feed, however, is lacking. In certain embodiments, the system accessed by a user device (14*a* or 14*b*) after scanning of a tag (16*a* or 16*b*) directs a user to a fan portal (218), wherein the fan portal contains a button or link (220) to access interactive content such as video or augmented video playback of the live event occurring in venue (202).

Figure 6:
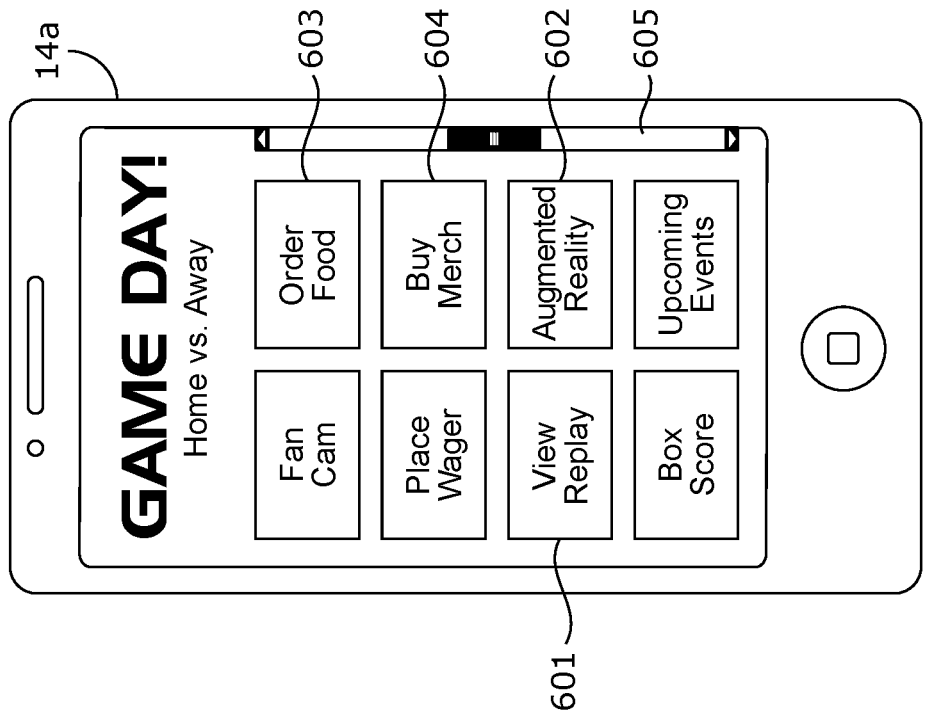
FIG. 6 depicts an embodiment of a GUI providing access to certain augmented replay and other system defined options.

FIG. 6 provides an example of a GUI for an interactive digital program as displayed on a user device (14*a*, 14*b*). The GUI comprises, in the present example, eight features, including a replay (601), an AR (augmented reality) (602), concessions (603), merchandise (604), as well as those to fan cam, placing a wager, box scores, and upcoming events. Each of these items being an operable button, wherein the user selecting any of the four, or any plurality of buttons would redirect the user to a new URL, or using the Web app, to load a particular page or update the Web app to deliver the desired content. In certain embodiments, a scroll bar (605) may be further displayed, as the GUI may have more buttons to select or additional content that can be accessed by scrolling on the display page. Those of ordinary skill in the art will recognize that the user can easily slide a finger along a display screen to access said information.

Figure 7:
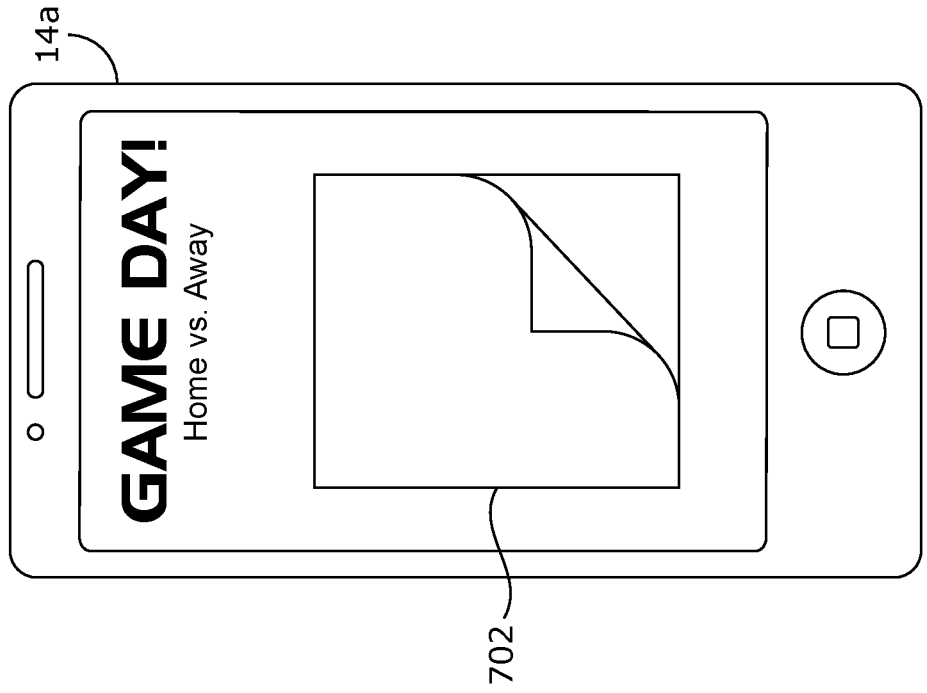
FIG. 7 depicts a further embodiment of a GUI related to certain user experiences accessed on the systems described herein.

FIG. 7 provides a further embodiment of an example of a target redirect page based on a given scan of an MRC. For example, after scanning a MRC, the displayed content may be redirected to the page providing the given details of the particular event for that particular day. Thus, instead of the menu as provided in FIG. 6, the screen may be a scrollable or page turn type display (702), which allows for certain content to be displayed in a separate page for improved viewing. Thus, a user can access the digital display in a similar manner to flipping the pages of a paper program. For example, FIG. 7 may also be a home screen or landing page from a re-direct and FIG. 6 may be a first page, for example providing an overview of available content for the user to access.

Figure 8:
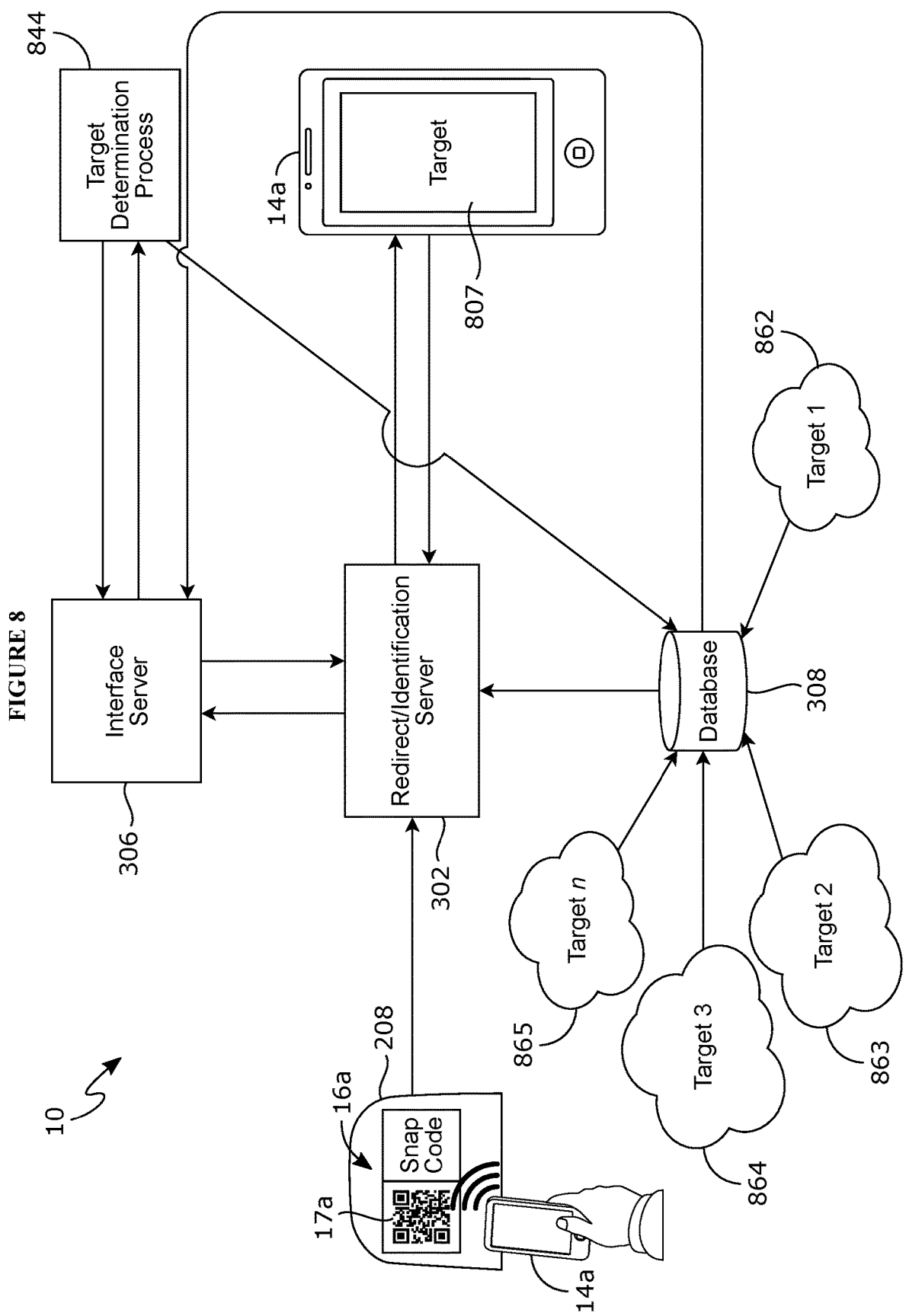
FIG. 8 depicts a diagram for accessing a video through an embodiment of the system detailed herein.

FIGS. 8, 9A and 9B depicts system (10) in greater detail. An example to orient the steps is wherein a user scans an MRC (17*a*) with a user device (14*a*), positioned on a seat (208). The scan of the tag is directed to the redirect/identification server (302), which is detailed above in FIG. 4, among others. In the example of FIG. 9A, the system (900) is providing a single replay of the most recent play on the field. Thus, the end target is a single video file. Thus, a first step in the method is to receive the redirect request (902), which passes through the interface server (306) to accesses the database (308) to access the target of the redirect request (904). The target determination process (844) then identifies the content to include in response to the request (906), a request for the data sources for the identified content (908) is sent and the data is received from the data sources (910), and the video file stored within the database (308) is retrieved. The data is assembled, whether via HTML or through push data (912), and the assembled video, is sent (914) back through the interface server (306), and through the redirect/identification server (302) to display the target video on the user device. After the video is watched, the user device (14*a*) can stay connected with the browser (916), which would allow for the next video upload to be automatically pushed or accessed on the user device (14*a*). If the user stays connected, the process can continue with the subsequent video. Simultaneously, or after the first video, the system can gather, analyze and save data from the user activities (918).

Thus, in further detail, one embodiment is performed by the scan of a tag with a user device. The user device (14*a*) is directed to a URL that is uniquely encoded to the tag which allows the user device (14*a*) to access the redirect/identification server (302) which verifies the location of the tag (16*a*) and ties it to a specific venue (202) by performing a tag look-up as more fully described starting at (428 from FIG. 4).

Taking the above into consideration with regard to certain functionalities of the system, the redirect/identification server (302) is informed of the incoming URL. The server then determines the location of the tag (16*a*) and the identification of the user device (14*a*). For example, if Joe is attending a Sunday football game at a stadium in Philadelphia and scans the tag positioned on the back of his seat, by performing a tag look-up as more fully described starting at (428 from FIG. 4), the redirect/identification server (302) will know that Joe is attending the Eagles game and only deliver targets in the form of content and/or digital offers to Joe's user device that is relevant to the Eagles game. Likewise, if Bob is attending a football game at a stadium in Dallas, being played on the same Sunday and at the same time as the game that Joe is attending and Bob scans the tag positioned on the back of his seat, the redirect/identification server (302), by performing a tag look-up as more fully described starting at (428 from FIG. 4), will know that Bob is attending the Cowboys game and will only deliver targets in the form of content and/or digital offers to Bob's user device that is relevant to the Cowboys game.

Next, within the system, the redirect/identification server (302) informs the interface server (306) of the URL request and provides the unique ID and the location of the tag (16*a*) that the user device (14*a*) scanned. The target determination process (844) executed by the interface server (306) determines what content to display to the user based upon the data received. In this example, the target determination process (844) would direct the interface server (306) to only deliver Joe targets such content in the form of video playback and augmented reality playback related to the Eagles game. This content may be all available content from that game, or it may be limited to a particular quarter, a particular play or a particular down. Likewise, the target determination process (844) would direct the interface server (306) to only deliver to Bob content related to the Cowboys game. Furthermore, because the user device (14*a*) is used to scan tags in the system (10) located at various locations outside of the venue, the redirect/identification server (302) will be able to determine the prominent geographic location of the user device (14*a*). For example, because Bob frequently scans tags linked to the system (10) in the Dallas area, the redirect/identification server (302) will make the determination that Bob is a Cowboys fan and the target determination process (844) will deliver targets in the form of video and augmented reality content to Bob that is related to the home team, in this instance, the Cowboys. However, if Joe, who predominately scans tags in the Philadelphia area, travels to Dallas to watch a football game and scans a tag in the stadium (202), the redirect/identification server (302) will identify that Joe is not from the Dallas area and will therefore, the target determination process (844) will deliver targets in the form of video and augmented reality content to Joe that is related to the away team. However, users may modify the selection of content based on their interactions with the system (10). Thus, information tied to the unique ID can determine what content is delivered. Similarly, the use of a geofence, or a global position determined by the scan, can also provide context to the content to be delivered. Finally, the user may provide input, for example into a GUI provided on the user device regarding the selection of desired content. By electing some content on the GUI, the system can provide the appropriate targets for content to be delivered to the user device.

The target determination process (844) thus selects from the database (308) what content to show and that content queried from "N" number of content sources. The database (308) contains unique redirect URLs to target 1 (862), target 2 (863), target 3 (864) and target "N" (865) as each video is assigned a target ID. Video "N" here representing the 4$^{th}$ and greater number of recording devices, such as video cameras or video feeds being provided into the system at any given time. The video can be a live feed, a file with video playback from a specific event that happened in the live event, an augmented reality file of a specific event that happened in the live event, or a pre-recorded video or augmented reality file.

Thereafter, the interface server (306) pulls a target (862-865), in this example, a video file or augmented reality file stored in the database (308) as determined by the target determination process (844) and sends the target (862-865), in this instance a video file or augmented reality file to the interface server (306). The interface server (306) then delivers the target (862-865) such as a video file or augmented reality file to the redirect/identification server (302). Finally, the redirect/identification server (302) delivers the redirect URL for the target (862-865) such as a video file or augmented reality file to the user device (14*a*).

To view the augmented video, the software may scan for a flat surface for displaying the augmented video. Those of skill in the art will recognize the present limitations with certain augmented video and recognize that improvements are being made to reduce such limitations or eliminate their requirements in the use of such augmented video. Any suitable flat surface may be utilized.

In view of FIG. 8 and FIG. 9B it is also understood that a redirect URL to the target (862-865) stored in the database (308) can be sent directly to the redirect/identification server (302) directly from the database (308) to the user device (14*a*) from a pre-populated GUI. The user selects the desired target, which is then played on the user device. This allows the prior replays stored in a catalog on the system to directly flow to the user device after being selected by the user, instead of having to be transmitted through the various software and servers in all circumstances.

Thus, as depicted by FIG. 9B, the available videos may be provided by a GUI, which provides different videos and access to said different videos. For example, videos may be organized by play, in sequential order, highlights, importance, such as scoring plays or game action, as well as determined by the user ID and such information, such that in our example, Bob would get Cowboys focused videos and Joe would get Eagle's focused videos. In certain embodiments, it may be appropriate to provide a thumbnail of a moment of the video, to allow a user to identify some additional aspect regarding the particular video. Thus, system (950) in FIG. 9B operates by scanning a tag with a user device to open a Web app or URL (920), and redirects to a target URL or opens the Web app having used the user ID the tag ID and/or user analytics to determine certain content (922). Here, the content is related to the game of the tag, where user ID may provide information for the user's preferred team, as one non-limiting example. A request is sent to query data sources (924), e.g., to seek video files for replay. A response is received from data sources (926) and content is displayed on the GUI (928), which is a selection of video files. A video file is selected from the GUI for replay (930), which sends a target to the server to be received (932) to access the video file and assemble the video file (934) that was selected. The video file now assembled is sent to the Web app (936) for viewing. The user can remain connected to the Web app (938) and certain data can be collected from user activities (940).

Thus, FIG. 9A provides the example where a single video file is being displayed to the user device (14*a*) and thus the system simply retrieves that video file for display, whereas FIG. 9B addresses that a listing of video files may be displayed on a GUI and wherein the user can make an election of the video file for consumption on the user device (14*a*).

FIG. 10 depicts a target (807) in this example, an augmented reality playback on a user device. In this example, Joe is at a football game. A fourth-down play has just been completed and Joe is unsure if his team completed the down or came up short in the distance. A replay is occurring on the field, but Joe wants to also see for himself what the expected outcome of the play is going to be. Joe uses his user device (14a) to scan the tag and accesses the fan portal Web app. The process of FIG. 5 selects the appropriate target in this instance, an augmented reality file from the database (308) and delivers the appropriate redirect URL for the most recent play to Joe's fan portal via the interface server and redirect/identification server. Joe uses his user device (14a) to access the augmented reality file. The augmented video is launched and Joe's perspective is generated within the augmented video. The device can be rotated on its horizontal x-axis (109) or its vertical y-axis (108) in order to modify the perspective. If Joe rotates his user device in one direction on the x-axis (112) he will be able to view the play from one angle. If Joe rotates his user device in the other direction on the x-axis (113), Joe will be able to watch the play from a different angle. Likewise, Joe can rotate his user device in one direction on the y-axis (110) to see the play from another perspective or in the opposite direction on the vertical y-axis (108) to see the play from yet a fourth perspective. Combining the movements on the x- and y-axes (110, 111, 112, 113) gives Joe the ability to move the perspective in almost an infinite number of ways to see the replay of the fourth down. When the augmented reality playback is initiated, the screen of the user device (14a) is populated with buttons (114, 115, 116, 117) that allow the user to control the augmented reality file. These buttons allow the file to play, stop, rewind or fast forward, as non-limiting examples of their function. This enhances the in-person fan experience as if there is a challenge to a play, or just curiosity, or any other reason, the user is able to view the instant replay via video or augmented reality from their own perspective. Similarly, such a system and replays may be utilized by referees or management within a game, wherein the replay can be used to determine the occurrence or outcome of the play.

The system (10) can utilize the tag to position the original orientation of the augmented video. Because of the known location of the tag, down to the exact seat via the tag look-up as more fully described starting at (step [428] from FIG. 4), the particular view and angle the user would experience from that seat is known. Thus, in certain embodiments the video may be different for Jane, as one user, as compared to Mary, who is a second user and is located at a different position within the venue. In other embodiments, the augmented video is the same for all users and it is up to the user to select the location and viewing angle they desire.

Figure 11A:
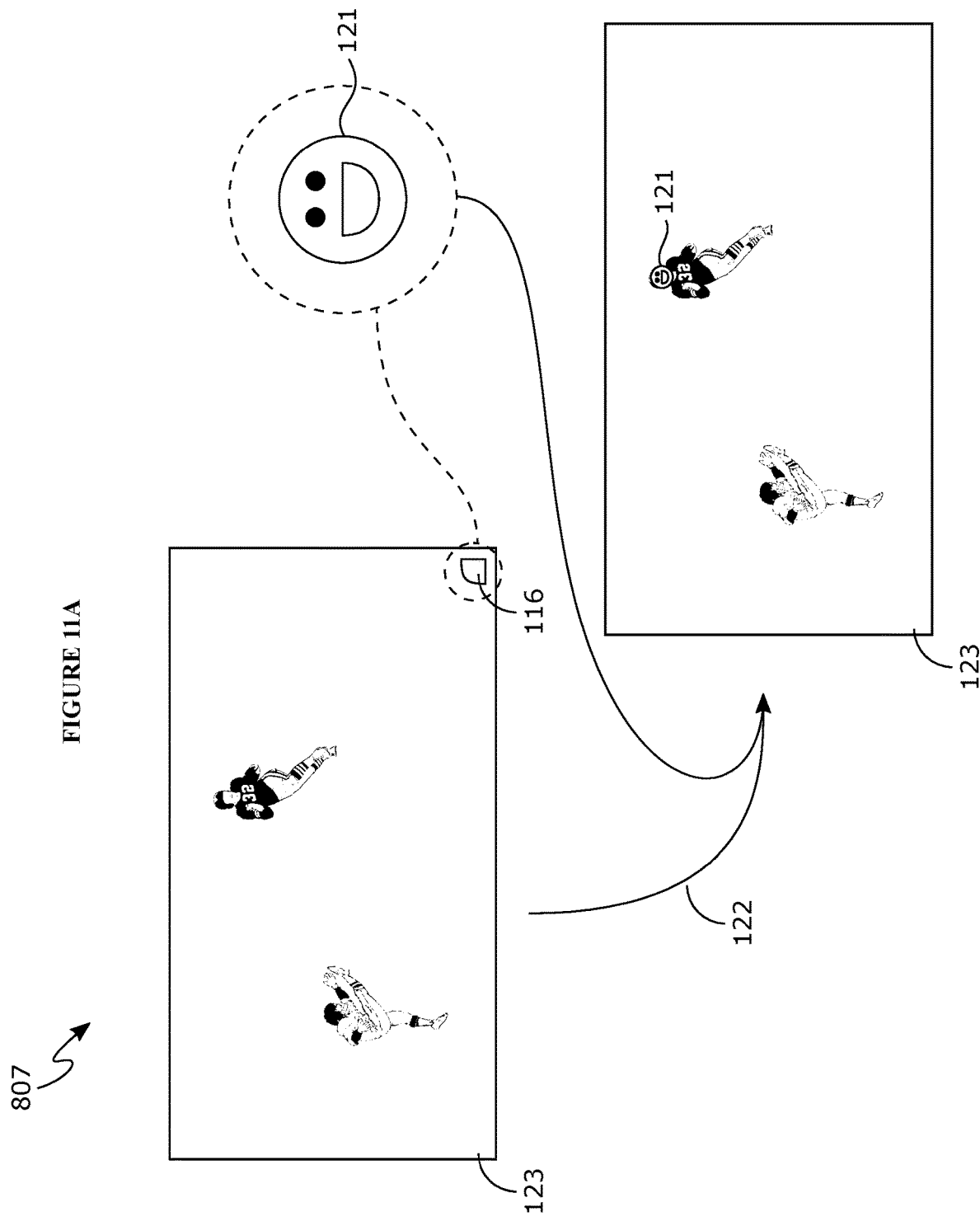
FIG. 11A depicts use of an avatar in augmented video.
Figure 12:
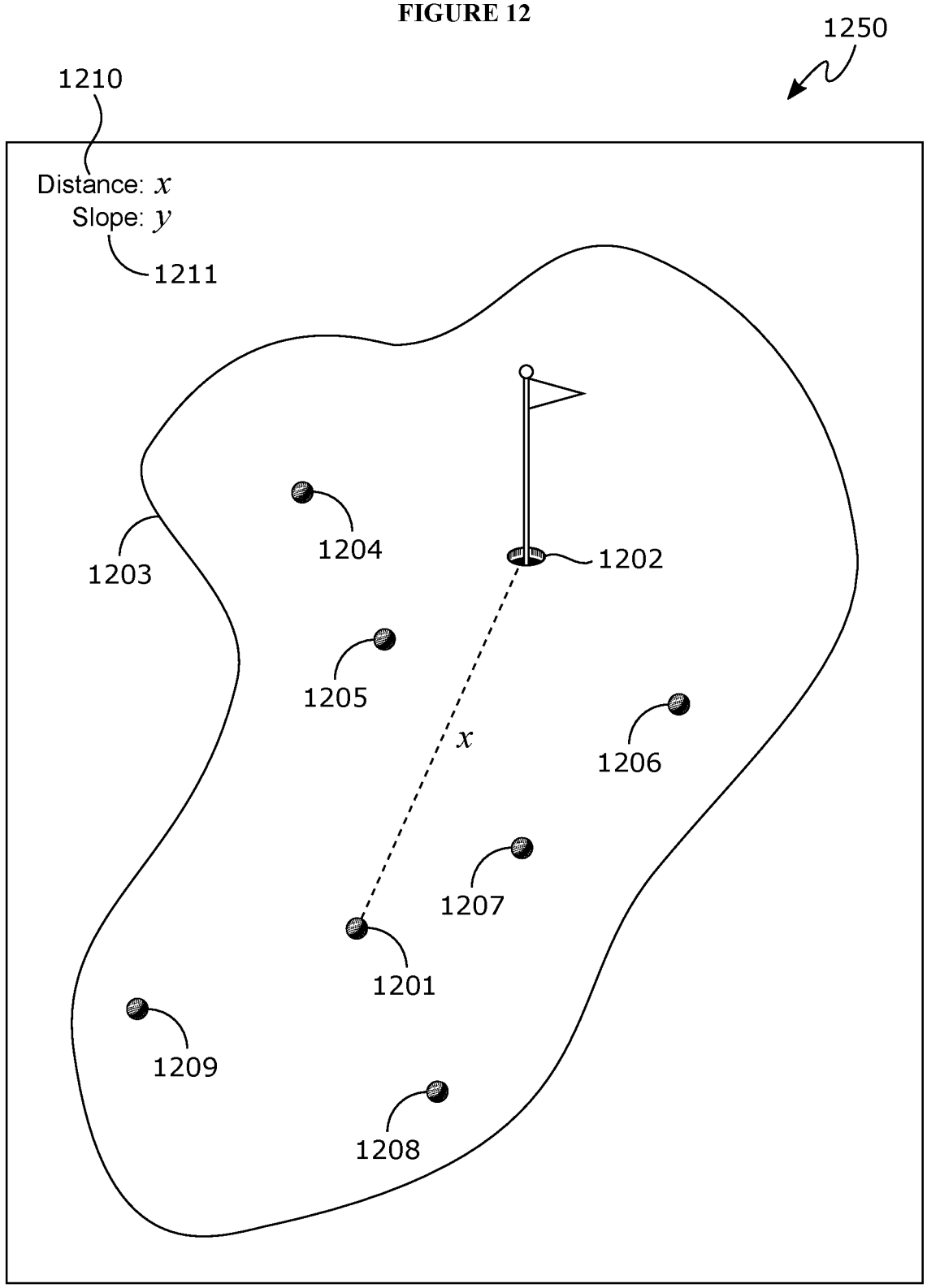
FIG. 12 depicts an augmented video file of a putting green.

FIG. 11A depicts a first-person perspective of target (807) such as an augmented reality playback. In this example, the user device scans a tag, creates an avatar (121) and accesses the fan portal, a Web app, or GUI to enter the system. The target determination process (844) selects the appropriate augmented reality file from the database (308) and delivers the appropriate redirect URL with first person perspective augmented reality files to the fan portal via the interface server and redirect/identification server. The user now watches the augmented reality video (123). This can be viewed in the third-person perspective. However, the user can use button or link (116) in the augmented reality video (123) to toggle the view (122) to the perspective that the user's avatar (121) is part of the live action. For example, Joe is at a football game, his team's wide receiver has caught a pass in the endzone to make a touchdown. Joe first watches the augmented reality video playback from the third-person perspective and then Joe activates button (116) toggling the view (122) so that Joe's avatar (121) now becomes the first-person view of the wide receiver as he makes the catch.

FIG. 11B provides a further overview of the process when utilizing an avatar. First a user would create an avatar (1102) via the user device or another computing device. Then, to view the file, the user would send the request for the AR file (1104), which is either directly played (see FIG. 9A) or user selected (FIG. 9B), wherein a request is provided and received (1106), and a particular AR file is sent (1108) through the platform, and the AR file then is played in the third person perspective (1110).

As detailed in FIG. 10, the perspective view can be toggled (1114) and a perspective changed (1112). Here, the created avatar (121) can then be assigned to a particular feature within the video (1116), and the AR is played with the avatar in that perspective (1118). The user can change the assignment (1120) of the avatar to a different perspective and re-watch the AR file. Once the file is completed the user can cease watching (1122).

Thus, in FIG. 11B, Joe can become the quarterback, a lineman or any other participant that is in the view of the replay. This allows for optimization and customized viewing of the particular replay based on the user's interest. By using the avatar and assigning the avatar to a particular player, the user can then watch and view the play as the player viewed it occurring. In certain embodiments, the user avatar can also become the ball. This allows the user to visualize the path of the ball in the air, across the field, through the defenders and being secured into the receiver's hands. Or, conversely, as the ball is intercepted or batted down, or if there is a running play.

The augmented video, with the avatar can also attach the avatar (a digital file, 301a, 301b) to literally put the avatar face on the player. This allows the person to add their face, or some facsimile of their face into the play via the system. This creates unique viewing opportunities and new fan engagement platforms.

Figure 13:
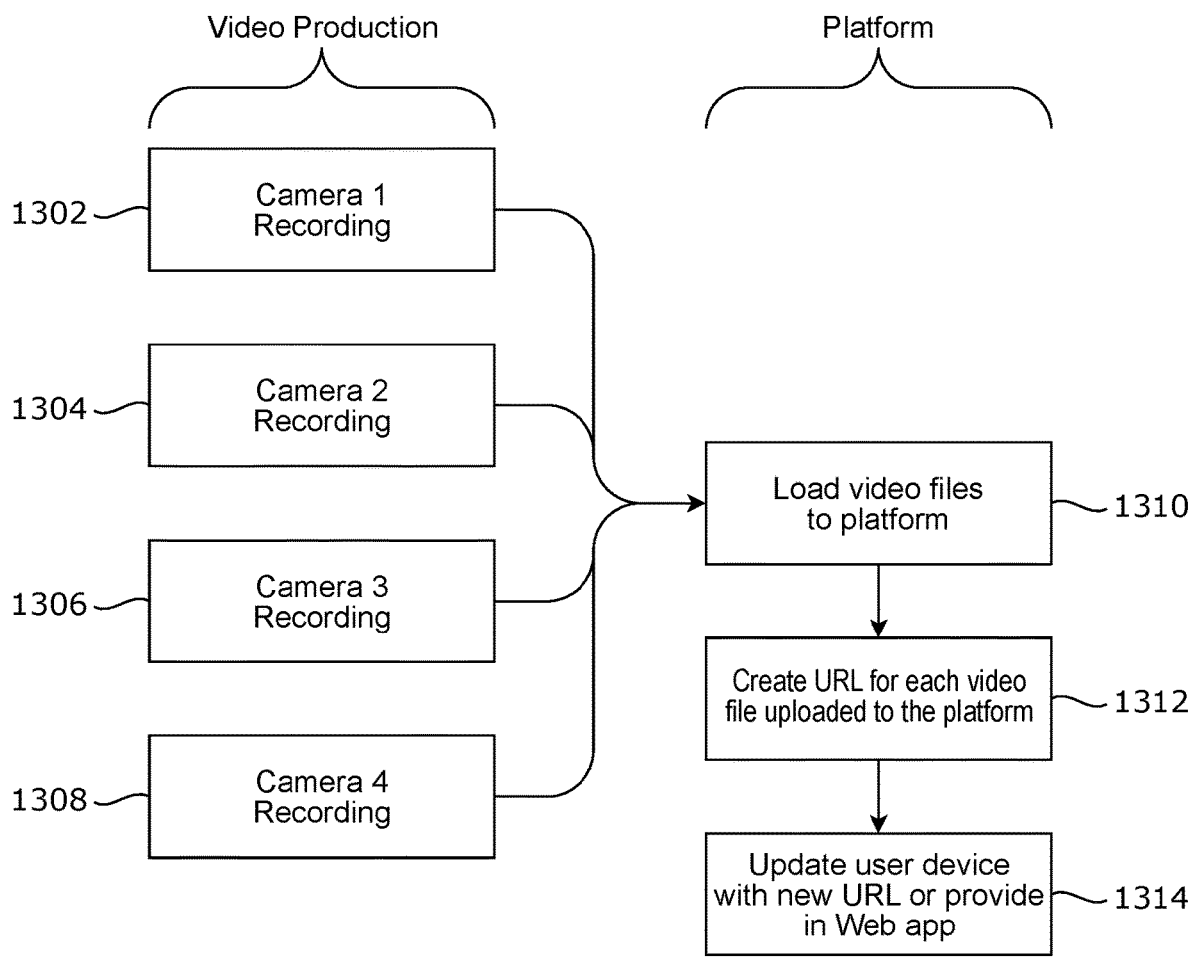
FIG. 13 depicts an embodiment of a method for loading a video to a system.

Notably, the video files are loaded into the database as understood by one of ordinary skill in the art. FIG. 13, however, provides a brief overview of such data collection, while omitting certain known steps and methods. For example, four recording devices, i.e., cameras, (206a, 206b, 206c, 206d from FIG. 2), capture video on the video production side. These are stored as camera 1 recording (1302), camera 2 recording (1304), camera 3 recording (1306) and camera 4 recording (1308). The video is loaded into a platform (1310), wherein the video files can be combined to create single or multiple videos. The advantage of combining several videos into a single file, especially, with high-definition files, such as LIDAR, the user is then able to modify the file to view in different perspectives. A URL is created for different video files (1312) whether that is a single file or multiple video files as created from the multiple cameras. Finally, upon request, the user device can be provided with the file (1314) to send a new URL or to display the video file Web app, or other methods generally known in the art for transmitting and displaying the video file. While embodiments disclosed herein use four cameras, it should be understood that N-number of cameras can be used to create the desired video file.

It is understood that the system (10) as more fully described above and in FIGS. 1-14 can be used in the following ways.

One embodiment is a system for delivering instant replays of live events to a user's device by scanning a tag. In this example, the live event is being recorded by a video production company. The video production company uses its crew and cameras to record an event such as a football game. The video production company films a play using multiple cameras. Once the play is complete, the video production company loads video files of that play from each camera angle to the interface server and assigns each video file a target ID. Alternatively, the video files are combined into a single video file, with the several different camera angles being used to create a single video file. The system then creates a unique redirect URL for each target, such as a video file, on the interface server.

In this embodiment, a user device (14a) may be used to scan or otherwise detect one of the tags (16a) which directs the user to a fan portal to a Web app, a URL, or to a GUI as non-limiting examples. As depicted in FIG. 6, an embodiment of the fan portal is populated with the redirect URLs for the targets, such as instant replay video files hosted on the interface server. The user selects the instant replay video that the user wishes to view and the user's device is directed to that video from the interface server.

For example, Joe is attending a football game at a stadium. The game is being produced by XYZ production company for consumption on live television and live internet stream. XYZ has ten cameras in the stadium recording the game. Once a play has concluded, XYZ will create a separate combined video file, which incorporates the video files as recorded by each camera and upload the combined video file, and/or the individual video files to the interface server where they are assigned a target ID. When Joe uses his user device to scan the tag on the arm rest of his seat, he is directed to the one of two options, either to a Web app that is populated with videos to select for viewing, which, when selected either retrieves a redirect URL to the targets, such as video files, on the interface server of the various camera angles from the recently completed play, or to a Web app to push such video file to the page. Joe clicks on a particular video target, in this instance, the video he wishes to view and watches that video on his phone. Alternatively, the video of the last play can automatically be pushed to Joe's user device for viewing. After the next play is completed, XYZ production company repeats the process of saving the video files of the play from each camera, as targets with a unique target ID, to the interface server. Now, the Web app re-populates, from a push or a pull on the system, to show the updated and new video, or to simply automatically play the new video. Joe selects the video he wishes to view for the second play and watches that video on his phone.

In another embodiment, a venue is equipped with a plurality of recording devices to capture live action. These could be cameras such as high resolution, high-frame rate video cameras, volumetric video capture hardware, depth sensing cameras, ultra-high FPS machine vision cameras, LIDAR sensors and LIDAR enabled cameras. The images from the cameras are stitched together to create a three-dimensional rendering of the play that was captured by the cameras. Stitching together or combining footage allows the video footage of the live action sports play to be turned into an augmented reality file that is stored on the interface server.

In this embodiment, a user device (14a) is used to scan one of the MRCs (17a) which directs the user to a Web app via a unique URL. The Web app provides the user with a GUI of certain video files or directly pushes the prior replay to the user device. Once the video is playing, the user places the augmented reality file by aiming the user device at a surface such as the seat, the ground or the playing field and replays the three-dimensional rendering of the live action play allowing the user to view the players from multiple angles. In this example, Joe is attending a football game at a venue. Once the play on the field is complete, Joe uses his user device to scan the tag on his arm rest which launches the Web app. The interface server populates that fan portal with the augmented reality, three-dimensional instant replay of the proceeding play.

In a further embodiment, instead of viewing the video for the proceeding play, Joe clicks on the appropriate video from the GUI which launches the target which is an augmented reality, three-dimensional instant replay on Joe's user device. Via the user device's camera, Joe is able to point his user device at a display surface, to launch the augmented video, which places Joe within the field of view for the replay from multiple angles. Typically, the view launches via a flat surface, however this can be accomplished by any generally accepted mechanism known in the art for viewing such files.

Figure 14:
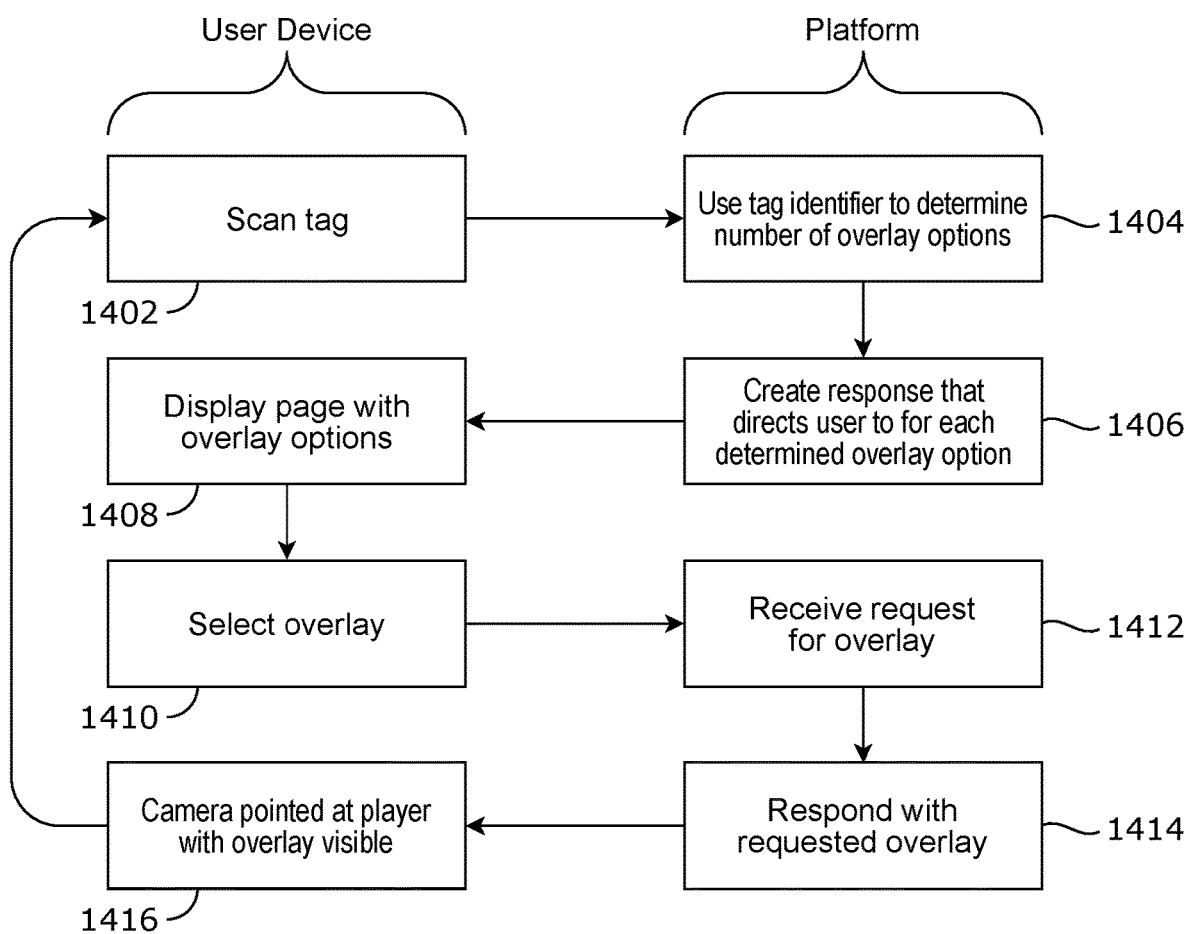
FIG. 14 depicts an embodiment of a method for selecting a graphical overlay for use in an augmented reality video through the system.

In a further embodiment, the user's device is used to provide an augmented reality graphical overlay that is superimposed on the real time event happening in the venue, as detailed in FIG. 14. In this example, Joe is attending a baseball game. Joe uses his user to scan the tag that is located on the arm rest of his seat (1402). The tag directs Joe to the Web app for the unique game that Joe is attending which is established by performing the tag look-up more fully described starting at (428 from FIG. 4). The system knows what is happening in real time at this particular event. So, when Joe scans the tag, the system knows that Casey Jones is up to bat and Bill Durham is pitching. Therefore, on this particular scan, the process of FIG. 5 presents Joe with two target options in the form of augmented reality options (1404). The first is a graphical overlay that shows statistics unique to Casey Jones, current through this particular time at bat, such as batting average, on-base percentage, hits, balls on base and strike outs. The second is a graphical overlay that shows statistics unique to Bill Durham such as innings pitched, hits, runs and earned runs, base on balls, strikes and home runs, together these are determined in (1406), and displays a GUI with the overlay options (1408). Joe decides which of these two graphical overlays he would like to use and selects that option from the fan portal (1410). The interface server receives the request (1412) and then delivers Joe the appropriate augmented reality graphical over lay that is superimposed over the underlying video (1414). Joe launches the augmented reality graphical over lay on his user device and points his user device at the player so that he can see that player's statistics while simultaneously watching the game (1416). Once that play has concluded, Joe can continue with the overlay as the subsequent play begins or, can close out of the particular feature or close out of the Web app as a whole. Likewise, when Casey Jones comes up to bat the next time, the interface server will populate the Web app with an augmented reality graphical user interface with then current statistics for Casey Jones, which now includes his last at-bat.

A tag can also be placed remote from a given venue, for example on a video feed of the particular game. Thus, if the given video feed of the game does not provide the desired information, a user can scan a tag on the video feed to provide unique overlay opportunities, as well as to view replays from the game on the described system, by accessing the system outside of the venue of the game via the tag on a video display, such as from a broadcast of the game.

In a further embodiment, the LIDAR sensor on the user device is used to create an augmented reality experience. For example, as in FIG. 12, Joe is attending a golf tournament. Joe would like to know the distance his favorite golfer must putt from his current location to sink the putt. The current ball location (1201) is shown x distance (1210) from the hole (1202). Joe uses his user device to scan one of the tags located throughout the viewing area which directs him to the Web app or GUI. From the Web app or GUI, Joe selects the appropriate target which launches an augmented reality viewer (1250). Joe aims the camera on his user device towards the golfer and launches the Web app. The Web app communicates with the user device, which accesses the LIDAR sensor on Joe's user device and calculates the distance x (1210) the golfer must putt to make the hole. Furthermore, the LIDAR sensor can define the slope (1211) of the green and provide an overlay of the estimated break for the particular putt, based on the slope. Notably, the system can also aggregate prior videos and use machine learning to further improve the measurements. Thus, the user device itself can be utilized as the video source and can provide the basis for overlay of information viewed on the user device.

Machine learning can be utilized in any of the embodiments herein, wherein a series of cameras are capturing the same or similar event or location at a different time. Thus, if the LIDAR sensor is placed on the first hole, as golfers A-Z play, there are likely at least 26 different putts that occurred on the green and allowing an improved distance estimation based on the prior events. On the green (1203), prior ball locations are displayed (1204, 1205, 1206, 1207, 1208, 1209) as non-liming examples of prior actions. Using the prior speed of the ball, the slope of the ground, the distance to the hole, wind conditions, etc. it could be calculated, for example, to hit the ball at a particular force, aimed at a particular location to make the putt. Thus, a superimposed image may recommend a ball speed off the putter of x and aiming at position y to make the putt. Indeed, Joe may not need the LIDAR sensor on his device, as the prior footage from each of the prior putts can be viewed and aggregated into a video file, which can be accessed by scanning the tag on the system. In this way, the current position of the ball (1201) can be visualized as to its expected path and the speed or distance necessary to get the ball into the hole. Certainly, such system can be used to train and practice putting as well.

In a further embodiment, the system is able to track the user's interactions with the target such as video playback and augmented reality files to determine user preferences and provide targeted marketing and digital offers. In this example, Bill is an avid football fan and frequently attends Cowboys games. When Bill uses his user device to scan or otherwise detect one of the tags to enable the system (10), the identification/redirect server tracks the interactions from Bill's user device and associates them with the database records corresponding to Bill's unique ID. Because Bill frequently views video playback and augmented reality files for one particular player on the Cowboys team, the identification/redirect server is able to determine that this player is likely one of Bill's favorite players and the identification/redirect server directs the interface server, via the process of FIG. 5 to deliver a digital offer for 25% off if Bill purchases a jersey for that particular player.

In certain embodiments, a user may be remote to the live action she is watching. Thus, a user may scan a tag displayed on a video feed, such as on a broadcast or cable broadcast of a baseball game. The system through the tag ID from the video feed will recognize that the user is remote and determine the unique ID and other factors within the system. Furthermore, geofencing can be utilized to determine location. Thus, using the unique ID, the tag ID, and other features of the system, the user can seamlessly be provided with target URL (namely a video, and most particularly an augmented reality video), which can then load on the user device launching an augmented reality video. The user is then able to provide certain further information and control the video as detailed herein.

In a further embodiment, because the system tracks a user's interactions with the video playback and augmented reality files, the identification/redirect server is able to determine the user's preferences such as favorite team or favorite player. This allows the identification/redirect server to direct the interface server via the process of FIG. 5, to select a target such as a video or augmented reality file from the database (308), that is related to the user's preferences such as a video from the team encouraging the user to make a donation to the team's foundation. The system will then redirect the user to a URL or update the Web app to allow the user to make a donation to that charity directly from the user device via the system.

Referring back to FIG. 3, the infrastructure detailed therein is exemplary, dividing processing between at least two servers (e.g., redirect/identification server [302] and interface server [306]), but embodiments are not so limited. The numbers and types of servers and software may be scaled up, down, and distributed according to platform (20) demands/needs. Furthermore, more than one virtual machine may run on a single computer and a computer/virtual machine may run more than one type of server software (e.g., the software that performs a service, e.g., Web service, application service, and the like). Thus, in some instances platform (20) may include one computer for all processing demands, and in other instances platform (20) may include several, hundreds, or even more computers to meet processing demands. Additionally, hardware, software, and firmware may be included in or removed from platform (20) to increase functionality, storage, and the like as needed/desired.

Administrator device (12), which is shown in FIG. 1, may be any type of computer such as a laptop computer, desktop computer, tablet, and the like. Similarly, user device (14a or 14b) may be any type of processing device such as a handheld computer (e.g., phone, smartphone, tablet, personal digital assistant), wearable computer (e.g., watch, glasses), or portable computers (e.g., laptop, netbooks). Scanning of the tag (16a, 16b) from the user device (14a or 14b) is performed through near-field communication (NFC) or use of a camera on the user device (14a or 14b) to scan the visible quick response code (QR code). Administrator device (12) and user devices (14a or 14b) typically include a browser application to facilitate communications with one or more servers among other things.

Administrator device (12), user devices (14a, 14b), and servers (e.g., 302, 306, 310, 312, 320, 322, and 324) may each be a general-purpose computer. Thus, each computer includes the appropriate hardware, firmware, and software to enable the computer to function as intended and as needed to implement features detailed herein. For example, a general-purpose computer may include, without limitation, a chipset, processor, memory, storage, graphics subsystem, and applications. The chipset may provide communication among the processor, memory, storage, graphics subsystem, and applications. The processor may be any processing unit, processor, or instruction set computers or processors as is known in the art. For example, the processor may be an instruction set based computer or processor (e.g., x86 instruction set compatible processor), dual/multicore processors, dual/multicore mobile processors, or any other microprocessing or central processing unit (CPU). Likewise, the memory may be any suitable memory device such as Random Access Memory (RAM), Dynamic Random-Access memory (DRAM), or Static RAM (SRAM), without limitation. The processor together with at least the memory may implement system and application software including instructions, including methods, disclosed herein. Examples of suitable storage includes magnetic disk drives, optical disk drives, tape drives, an internal storage device, an attached storage device, flash memory, hard drives, and/or solid-state drives (SSD), although embodiments are not so limited.

In an embodiment, servers (e.g., 302, 306, 310, 312, 320, 322, an/or 324) may include database server functionality to manage database (308) or another database. Although not shown, infrastructure variations may allow for database (308) to have a dedicated database server machine. Database (308) and any other database may be any suitable database such as hierarchical, network, relational, object-oriented, multimodal, nonrelational, self-driving, intelligent, and/or cloud based to name a few examples. Although a single database (308) is shown in FIG. 3, in embodiments database (308) may comprise more than one database, the more than one database may be distributed across many locations, and data may be redundantly recorded in the more than one database. Furthermore, data may be stored in blocks that are part of a chronological blockchain (314) and may be dispersed across a decentralized distributed ledger. Blocks of data in a blockchain are linked in such a way that tampering with one block breaks the chain. Thus, digital data stored in a blockchain is verifiable with an elevated level of integrity. Therefore, the database (308) may also be a distributed database system, utilizing blockchain (e.g., 314) to provide for storage of NFTs or the like related to the system. As with any distributed database, the number of databases and particular nature of the blockchain storage is dependent on the particular exchange or blockchain utilized for the NFT as one non-limiting example. The use of a distributed database system is well known and the storage of an NFT or the like requires the use of such systems. Geofence (316) and Time (318) may be software services provided by the platform (20). These services (316, 318) may be executed by any or all of the computing machines, virtual or otherwise, found on the platform (20). These services may use data from one or more user devices (14a, 14b) and other data sources to provide their intended functionality as is known in the art.

It will be appreciated that the embodiments and illustrations described herein are provided by way of example, and that the present invention is not limited to what has been particularly disclosed. Rather, the scope of the present invention includes both combinations and sub combinations of the various features described above, as well as variations and modifications thereof that would occur to persons skilled in the art upon reading the forgoing description and that are not disclosed in the prior art. Therefore, the various systems and methods may include one or all of the limitations of an embodiment, be performed in any order, or may combine limitations from different embodiments, as would be understood by those implementing the various methods and systems detailed herein.

What is claimed is:
1. An augmented video system comprising:
a machine-readable code defined on a tag, the machine-readable code locally encoded to tie the tag to a particular venue, a server, a plurality of video cameras, a database, and software capable of being operated on said server;
wherein said plurality of video cameras capture a moment in time, each of said plurality of video cameras capturing a video file of said moment in time from a different perspective and storing each of said video files in said database; wherein said software combines each of said video files into a combined video file;
wherein said server, responsive to initial access by a user device via scanning the machine-readable code, generates a URL encoded to the tag that was scanned by the user device and to the combined video file, the generated URL subsequently used by said user device to send a request to said server to view the combined video file; and
wherein, responsive to the subsequent request to view the combined video file from said user device, said combined video file is directed back to the server in an assembled form for transmission of said combined video file to said user device, said combined video file being operably viewable as a video file on said user device.

2. The augmented video system of claim 1 wherein said combined video file can be modified by a user to change the perspective of the combined video file.

3. The augmented video system of claim 2 wherein the combined video file being modified is performed by a rotation of the user device along a horizontal axis or a vertical axis.

4. The augmented video system of claim 2 wherein the combined video file being modified by a user is performed by touching a button operable to the user device.

5. The augmented video system of claim 1 wherein the server further identifies the user device or a user within the augmented video system.

6. The augmented video system of claim 5 wherein the server further identifies user analytics, said user analytics stored in a database and corresponding to a unique ID assigned to said user device.

7. The augmented video system of claim 1 wherein the plurality of video cameras is selected from the group consisting of: high resolution, high frame rate video cameras, volumetric video capture hardware, depth sensing cameras, ultra-high FPS machine vision cameras, LIDAR sensors, LIDAR-enabled cameras, and combinations thereof.

8. The augmented video system of claim 1 wherein an augmented video comprises an avatar added to the combined video file.

9. The augmented video system of claim 8 wherein the avatar participates in the augmented video by replacing one or more elements within the augmented video.

10. The augmented video system of claim 8 wherein the augmented video is displayed by an avatar perspective, wherein the avatar perspective modifies the perspective of the augmented video to a first-person view of the augmented video based upon placement of the avatar within the augmented video.

11. A method of viewing a video replay in augmented reality comprising:
a. capturing a moment in time on a plurality of video cameras, said plurality of video cameras each capturing the same moment in time from a different perspective to create a plurality of video files;
b. stitching the plurality of video files together from the plurality of video cameras to create a combined video file;

c. generating a replay from the combined video file on a user device by scanning a tag locally encoded to identify a particular venue and a particular point of interest linked to the particular venue;

d. in response to scanning the tag, and by receiving a request at a server in response thereto, generating, on the server, a URL encoded to the particular tag that was scanned by the user device and to a target of a redirect request;

e. accessing the target of the redirect request;

f. identifying a content of said combined video file to be included in said request;

g. receiving data from a database including said content;

h. assembling the combined video file;

i. sending said combined video file to said user device; and j. accessing said combined video file on said user device.

12. The method of claim 11 further comprising:

modifying a visual angle of the combined video file by receiving at said user device a rotation along a horizontal axis or a vertical axis;

wherein rotating along the vertical axis rotates the viewing of the combined video file around a viewer in the vertical axis; and wherein rotating along the horizontal axis rotates the viewing of the combined video file along the horizontal axis.

13. The method of claim 11 wherein the combined video file to be viewed is selected from a list of one or more video files displayed on a GUI, wherein selection from the GUI sends a request to the server to access the combined video file, and wherein the combined video file is assembled and delivered to said user device.

14. The method of claim 11 further comprising a set of data to be superimposed over the video file, wherein the superimposed set of data provides live statistics regarding one or more players viewed within the combined video file.

15. The augmented video system of claim 1 wherein the machine-readable code locally encodes a tag ID to tie the tag to the particular venue and wherein the server uses the tag ID to determine the particular venue to which the tag is tied and to identify a particular point of interest linked to the particular venue.

16. The augmented video system of claim 15 wherein generating a URL includes appending the tag ID to the URL to encode the URL to the tag.

17. The augmented video system of claim 15 wherein the server uses the tag ID to determine if concurrent requests originate from the same venue or different venues.

18. The augmented video system of claim 15 wherein the original orientation of the combined video file operably viewable on said user device is based on the particular point of interest identified by the tag ID.

19. The augmented video system of claim 15 further comprising determining, using the tag ID, if an event is in progress at the time the tag was scanned by the user device.

20. The augmented video system of claim 15 further comprising determining if the tag ID belongs to a tag grouping and, if so, transmitting content designated for the tag grouping to the user device.

* * * * *